United States Patent
Gao

(10) Patent No.: US 12,418,924 B2
(45) Date of Patent: Sep. 16, 2025

(54) PHYSICAL DOWNLINK SHARED CHANNEL RECEPTION METHOD AND DEVICE, PHYSICAL DOWNLINK SHARED CHANNEL TRANSMISSION METHOD AND DEVICE, APPARATUS AND MEDIUM

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 397 days.

(21) Appl. No.: 17/922,341

(22) PCT Filed: Apr. 21, 2021

(86) PCT No.: PCT/CN2021/088547
§ 371 (c)(1),
(2) Date: Oct. 28, 2022

(87) PCT Pub. No.: WO2021/218719
PCT Pub. Date: Nov. 4, 2021

(65) Prior Publication Data
US 2023/0180250 A1 Jun. 8, 2023

(30) Foreign Application Priority Data
Apr. 30, 2020 (CN) .......................... 202010362370.5

(51) Int. Cl.
*H04W 72/04* (2023.01)
*H04L 5/00* (2006.01)
*H04W 72/23* (2023.01)

(52) U.S. Cl.
CPC ........... *H04W 72/23* (2023.01); *H04L 5/0053* (2013.01); *H04L 5/0094* (2013.01)

(58) Field of Classification Search
CPC .......................... H04L 1/1812; H04W 72/232
See application file for complete search history.

(56) References Cited

U.S. PATENT DOCUMENTS

2020/0022175 A1 1/2020 Xiong
2021/0112563 A1 4/2021 Hua et al.
(Continued)

FOREIGN PATENT DOCUMENTS

CN 110636616 A 12/2019
CN 111865512 A 10/2020
(Continued)

OTHER PUBLICATIONS

Extended European Search Report for the corresponding European Patent Application No. 21796881.7 issued by the European Patent Office on Aug. 25, 2023.
(Continued)

*Primary Examiner* — Zhiren Qin
(74) *Attorney, Agent, or Firm* — Ladas & Parry, LLP

(57) ABSTRACT

The present disclosure provides PDSCH reception method and device, PDSCH transmission method and device, an apparatus and a medium. A terminal receives DCI for scheduling the transmission of a PDSCH on a plurality of carriers, determines a time unit where the one or more PDSCHs are transmitted on the plurality of carriers in accordance with a reference SCS or an SCS of each carrier, and receives the scheduled PDSCH in the determined one or more time units on the plurality of carriers. A base station transmits the DCI, and transmits the scheduled PDSCH in a time unit where the one or more PDSCHs are transmitted on the plurality of carriers. The terminal determines the time
(Continued)

unit where the one or more PDSCHs are transmitted on the plurality of carriers in accordance with the reference SCS or the SCS of each carrier.

24 Claims, 6 Drawing Sheets

(56) References Cited

U.S. PATENT DOCUMENTS

| | | | |
|---|---|---|---|
| 2021/0136808 A1 | 5/2021 | Yang et al. | |
| 2022/0240187 A1* | 7/2022 | Guo | H04W 76/30 |
| 2022/0295531 A1* | 9/2022 | Lee | H04L 5/001 |
| 2022/0394681 A1* | 12/2022 | Takahashi | H04L 5/0044 |
| 2023/0101410 A1* | 3/2023 | Cheng | H04L 27/26025 |
| | | | 375/262 |

FOREIGN PATENT DOCUMENTS

| | | |
|---|---|---|
| EP | 4138483 A1 | 2/2023 |
| WO | 2018175820 A1 | 9/2018 |
| WO | 2020011084 A1 | 1/2020 |

OTHER PUBLICATIONS

International Search Report for PCT Application PCT/CN2021/088547 issued on Jul. 14, 2021, and its English Translation provided by WIPO.

Written Opinion for PCT Application PCT/CN2021/088547 issued on Jul. 14, 2021, and its English Translation provided by WIPO.

International preliminary report on Patentability for PCT Application PCT/CN2021/088547 issued on Oct. 27, 2022, and its English Translation provided by WIPO.

"Remaining issues on cross-carrier scheduling," 3GPP TSG RAN WG1 Meeting #99, Reno, USA, Nov. 18-22, 2019, R1-1911974, Source: ZTE Corporation, Agenda item: 7.2.13.6, all pages.

* cited by examiner

PHYSICAL DOWNLINK SHARED CHANNEL RECEPTION METHOD AND DEVICE, PHYSICAL DOWNLINK SHARED CHANNEL TRANSMISSION METHOD AND DEVICE, APPARATUS AND MEDIUM

CROSS-REFERENCE TO RELATED APPLICATIONS

This application is the U.S. national phase of PCT Application No. PCT/CN2021/088547 filed on Apr. 21, 2021, which claims priority to the Chinese patent application No. 202010362370.5 filed on Apr. 30, 2020, which are incorporated herein by reference in their entireties.

TECHNICAL FIELD

The present disclosure relates to the field of wireless communication technology, in particular to a Physical Downlink Shared Channel (PDSCH) reception method, a PDSCH reception device, a PDSCH transmission method, a PDSCH transmission device, an apparatus and a medium.

BACKGROUND

Flexible timing relation is supported in a new wireless communication system (i.e., $5^{th}$-Generation New Radio Access Technology (RAT) (5G NR)). For a PDSCH, a Physical Downlink Control Channel (PDCCH) carrying its scheduling information indicates scheduling timing (i.e., K0) between the PDSCH and the PDCCH as well as Hybrid Automatic Repeat reQuest Acknowledgement (HARQ-ACK) timing (i.e., K1) between the PDSCH and a corresponding HARQ-ACK.

To be specific, in a Downlink Control Information (DCI) format used by the PDCCH, a Time Domain Resource Assignment (TDRA) indication field indicates a slot offset K0 of a slot where the PDSCH is located relative to a slot where the PDCCH (i.e., DCI, because the DCI is a specific transmission format of the PDCCH, and they are considered to be equivalent to each other in terms of describing the scheduling and the scheduling relation) is located. In the DCI format, a PDSCH-to-HARQ_feedack timing indication field indicates the quantity K1 of slots between the end of the PDSCH and the beginning of the HARQ-ACK, i.e., the PDSCH transmitted within a slot n is used to transmit the HARQ-ACK within a slot n+K1. FIG. 1 shows downlink scheduling timing and the HARQ-ACK feedback timing.

To be specific, the transmission of the PDSCH within a slot $$\left\lfloor n \cdot \frac{2^{\mu_{PDSCH}}}{2^{\mu_{PDCCH}}} \right\rfloor + K_0$$

is scheduled through the DCI transmitted within the slot n, where $K_0$ is defined on the basis of a numerology (a baseband parameter including a series of parameters such as Sub-Carrier Space (SCS)) of the PDSCH, i.e., K0=1 represents one slot defined on the basis of the numerology of the PDSCH, $\mu_{PDSCH}$ represents the SCS of the PDSCH, and $\mu_{PDCCH}$ represents an SCS of the PDCCH (i.e., a channel carrying the DCI).

Based on the above formula, when the SCS of the PDCCH is different from that of the PDSCH (e.g., when the PDCCH and the PDSCH are transmitted on different carriers, i.e., the transmission of the PDSCH on one carrier is scheduled through the DCI in a cross-carrier manner), an index number of the slot n where the DCI is transmitted is converted into an index number of a slot in the SCS corresponding to the PDSCH in accordance with a difference between the SCSs of the PDCCH and the PDSCH to obtain a reference slot $$\left\lfloor n \cdot \frac{2^{\mu_{PDSCH}}}{2^{\mu_{PDCCH}}} \right\rfloor,$$

and then the reference slot $$\left\lfloor n \cdot \frac{2^{\mu_{PDSCH}}}{2^{\mu_{PDCCH}}} \right\rfloor$$

is offset by K0 slots to obtain the slot where the one or more PDSCHs are transmitted. FIG. 2 shows the slot where the one or more PDSCHs are transmitted after offsetting the reference slot by K0 slots.

Currently, one PDCCH is merely used to schedule the transmission of one PDSCH on one carrier. The PDSCH and the PDCCH may be on a same carrier (i.e., current-carrier scheduling) or on different carriers (i.e., cross-carrier scheduling).

However, in the related art, when the transmission of the PDSCH on a plurality of carriers is scheduled simultaneously through one piece of DCI, there is currently no scheme to determine slots where the one or more PDSCHs are transmitted on the plurality of carriers in accordance with a same scheduling timing value (i.e., K0) notified in the DCI.

SUMMARY

An object of the present disclosure is to provide a PDSCH reception method, a PDSCH reception device, a PDSCH transmission method, a PDSCH transmission deice, an apparatus, and a medium, so as to, when the transmission of the PDSCH on a plurality of carriers is scheduled simultaneously through one piece of DCI, determine slots where the one or more PDSCHs are transmitted on the plurality of carriers in accordance with a same scheduling timing value (i.e., K0) notified in the DCI.

In one aspect, the present disclosure provides in some embodiments a PDSCH reception method, including: receiving first DCI, the first DCI being used to schedule one or more PDSCHs on a plurality of carriers; determining one or more time units where the one or more PDSCHs are transmitted on the plurality of carriers in accordance with a reference SCS or an SCS of each carrier; and receiving the one or more PDSCHs in the determined one or more time units on the plurality of carriers.

In some possible embodiments of the present disclosure, the reference SCS is an SCS corresponding to the transmission of the DCI, a maximum one of SCSs of the plurality of carriers, or a minimum one of the SCSs of the plurality of carriers.

In some possible embodiments of the present disclosure, the receiving the one or more PDSCHs in the determined one or more time units on the plurality of carriers includes: determining a set of time-domain symbols for a PDSCH in a determined time unit on each carrier of the plurality of carriers in accordance with a start symbol and a transmission length determined in accordance with an indication field in the first DCI; and receiving the PDSCH in the determined set of time-domain symbols.

In some possible embodiments of the present disclosure, the time unit is a predefined time period including A symbols, a subframe, a slot or a sub-slot, where A is a positive integer.

In some possible embodiments of the present disclosure, when the one or more time units where the one or more PDSCHs are transmitted on the plurality of carriers is determined in accordance with the reference SCS or the SCS of each carrier, the PDSCH reception method further includes determining the one or more time units where the one or more PDSCHs are transmitted on the plurality of carriers in accordance with (i) a time unit offset and (ii) the reference SCS or the SCS of each carrier.

In some possible embodiments of the present disclosure, the determining the one or more time units where the one or more PDSCHs are transmitted on the plurality of carriers in accordance with the time unit offset and the reference SCS includes determining a reference time unit on the basis of the reference SCS in accordance with a time unit where the first DCI is transmitted and the time unit offset, and determining that a PDSCH is transmitted within a time unit overlapping with the reference time unit on each carrier of the plurality of carriers, the time unit offset being determined in accordance with the reference SCS.

In some possible embodiments of the present disclosure, when there is a plurality of time units overlapping with the reference time unit on each carrier of the plurality of carriers, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

In some possible embodiments of the present disclosure, when there is a plurality of time units overlapping with the reference time unit, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the SCS of each carrier includes, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

In some possible embodiments of the present disclosure, the time unit offset is one or more time unit offsets between the first DCI and the one or more PDSCHs.

In some possible embodiments of the present disclosure, the time unit offset is a time unit interval between the time unit where the first DCI is transmitted and a time unit where the scheduled PDSCH is transmitted.

In some possible embodiments of the present disclosure, the time unit offset is determined through an indication field in the first DCI, or configured through high-layer signaling.

In some possible embodiments of the present disclosure, the time unit offset is shared by the one or more PDSCHs on the plurality of carriers.

In another aspect, the present disclosure provides in some embodiments a PDSCH transmission method, including: transmitting first DCI, the first DCI being used to schedule one or more PDSCHs on a plurality of carriers; and transmitting the one or more PDSCHs in one or more time units where the one or more PDSCHs are transmitted on the plurality of carriers. The time unit where the one or more PDSCHs are transmitted on the plurality of carriers is determined in accordance with a reference SCS or an SCS of each carrier.

In some possible embodiments of the present disclosure, the reference SCS is an SCS corresponding to the transmission of the DCI, a maximum one of SCSs of the plurality of carriers, or a minimum one of the SCSs of the plurality of carriers.

In some possible embodiments of the present disclosure, the transmitting the one or more PDSCHs in the one or more time units where the one or more PDSCHs are transmitted on the plurality of carriers includes transmitting, in the one or more time units where the one or more PDSCHs are transmitted, the PDSCH in a set of time-domain symbols including a start symbol and a transmission length indicated through an indication field in the first DCI on each carrier of the plurality of carriers.

In some possible embodiments of the present disclosure, when a time unit offset is indicated through the indication field in the first DCI, prior to transmitting the first DCI, the PDSCH transmission method further includes determining one or more time units where the one or more PDSCHs scheduled through the first DCI on the plurality of carriers are transmitted on each carrier, and determining the time unit offset indicated in the first DCI in accordance with (i) the time unit and (ii) the reference SCS or the SCS of each carrier of the plurality of carriers.

In some possible embodiments of the present disclosure, when the time unit offset is preconfigured through high-layer signaling, prior to transmitting the one or more PDSCHs in the one or more time units where the one or more PDSCHs are transmitted on the plurality of carriers, the PDSCH transmission method further includes determining the one or more time units where the one or more PDSCHs are transmitted on the plurality of carriers in accordance with (i) the time unit offset and (ii) the reference SCS or the SCS of each carrier.

In some possible embodiments of the present disclosure, the time unit is a predefined time period including A symbols, a subframe, a slot or a sub-slot, where A is a positive integer.

In some possible embodiments of the present disclosure, when the one or more time units where the one or more PDSCHs are transmitted on the plurality of carriers is determined in accordance with the reference SCS or the SCS of each carrier, the PDSCH transmission method further includes determining the one or more time units where the one or more PDSCHs are transmitted on the plurality of carriers in accordance with (i) a time unit offset and (ii) the reference SCS or the SCS of each carrier.

In some possible embodiments of the present disclosure, the determining the one or more time units where the one or more PDSCHs are transmitted on the plurality of carriers in accordance with the time unit offset and the reference SCS includes determining a reference time unit on the basis of the reference SCS in accordance with the time unit where the first DCI is transmitted and the time unit offset, and determining that a PDSCH is transmitted in a time unit overlapping with the reference time unit on each carrier of the plurality of carriers, and the time unit offset is determined in accordance with the reference SCS.

In some possible embodiments of the present disclosure, when there is a plurality of time units overlapping with the reference time unit on each carrier of the plurality of carriers, the PDSCH is determined to be transmitted in each time unit or in a first or last time unit among the plurality of time units.

In some possible embodiments of the present disclosure, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

In some possible embodiments of the present disclosure, when there is a plurality of time units overlapping with the reference time unit, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the SCS of each carrier includes, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

In some possible embodiments of the present disclosure, the time unit offset is one or more time unit offsets between the first DCI and the one or more PDSCHs.

In some possible embodiments of the present disclosure, the time unit offset is a time unit interval between the time unit where the first DCI is transmitted and a time unit where the scheduled PDSCH is transmitted.

In some possible embodiments of the present disclosure, the time unit offset is determined through an indication field in the first DCI, or configured through high-layer signaling.

In some possible embodiments of the present disclosure, the time unit offset is shared by the one or more PDSCHs on the plurality of carriers.

In yet another aspect, the present disclosure provides in some embodiments a terminal, including a processor, a memory and a transceiver. The processor is configured to read a program in the memory, so as to: receive first DCI, the first DCI being used to schedule one or more PDSCHs on a plurality of carriers; determine one or more time units where the one or more PDSCHs are transmitted on the plurality of carriers in accordance with a reference SCS or an SCS of each carrier; and receive the one or more PDSCHs in the determined one or more time units on the plurality of carriers. The transceiver is configured to receive and transmit data under the control of the processor.

In some possible embodiments of the present disclosure, the reference SCS is an SCS corresponding to the transmission of the DCI, a maximum one of SCSs of the plurality of carriers, or a minimum one of the SCSs of the plurality of carriers.

In some possible embodiments of the present disclosure, the receiving the one or more PDSCHs in the determined one or more time units on the plurality of carriers includes: determining a set of time-domain symbols for a PDSCH in a determined time unit on each carrier of the plurality of carriers in accordance with a start symbol and a transmission length determined in accordance with an indication field in the first DCI; and receiving the PDSCH in the determined set of time-domain symbols.

In some possible embodiments of the present disclosure, the time unit is a predefined time period including A symbols, a subframe, a slot or a sub-slot, where A is a positive integer.

In some possible embodiments of the present disclosure, when the one or more time units where the one or more PDSCHs are transmitted on the plurality of carriers is determined in accordance with the reference SCS or the SCS of each carrier, the processor is further configured to determine the one or more time units where the one or more PDSCHs are transmitted on the plurality of carriers in accordance with (i) a time unit offset and (ii) the reference SCS or the SCS of each carrier.

In some possible embodiments of the present disclosure, the determining the one or more time units where the one or more PDSCHs are transmitted on the plurality of carriers in accordance with the time unit offset and the reference SCS includes determining a reference time unit on the basis of the reference SCS in accordance with a time unit where the first DCI is transmitted and the time unit offset, and determining that a PDSCH is transmitted within a time unit overlapping with the reference time unit on each carrier of the plurality of carriers, the time unit offset being determined in accordance with the reference SCS.

In some possible embodiments of the present disclosure, when there is a plurality of time units overlapping with the reference time unit on each carrier of the plurality of carriers, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

In some possible embodiments of the present disclosure, when there is a plurality of time units overlapping with the reference time unit, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the SCS of each carrier includes, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

In some possible embodiments of the present disclosure, the time unit offset is one or more time unit offsets between the first DCI and the one or more PDSCHs.

In some possible embodiments of the present disclosure, the time unit offset is a time unit interval between the time unit where the first DCI is transmitted and a time unit where the scheduled PDSCH is transmitted.

In some possible embodiments of the present disclosure, the time unit offset is determined through an indication field in the first DCI, or configured through high-layer signaling.

In some possible embodiments of the present disclosure, the time unit offset is shared by the one or more PDSCHs on the plurality of carriers.

In still yet another aspect, the present disclosure provides in some embodiments a base station, including a processor, a memory and a transceiver. The processor is configured to read a program in the memory, so as to: transmit first DCI, the first DCI being used to schedule one or more PDSCHs on a plurality of carriers; and transmit the one or more PDSCHs in one or more time units where the one or more PDSCHs are transmitted on the plurality of carriers. The time unit where the one or more PDSCHs are transmitted on the plurality of carriers is determined in accordance with a reference SCS or an SCS of each carrier. The transceiver is configured to receive and transmit data under the control of the processor.

In some possible embodiments of the present disclosure, the reference SCS is an SCS corresponding to the transmission of the DCI, a maximum one of SCSs of the plurality of carriers, or a minimum one of the SCSs of the plurality of carriers.

In some possible embodiments of the present disclosure, the transmitting the one or more PDSCHs in the one or more time units where the one or more PDSCHs are transmitted on the plurality of carriers includes transmitting, in the one or more time units where the one or more PDSCHs are transmitted, the PDSCH in a set of time-domain symbols including a start symbol and a transmission length indicated through an indication field in the first DCI on each carrier of the plurality of carriers.

In some possible embodiments of the present disclosure, when a time unit offset is indicated through the indication field in the first DCI, prior to transmitting the first DCI, the processor is further configured to determine one or more time units where the one or more PDSCHs scheduled through the first DCI on the plurality of carriers are transmitted on each carrier, and determine the time unit offset indicated in the first DCI in accordance with (i) the time unit and (ii) the reference SCS or the SCS of each carrier of the plurality of carriers.

In some possible embodiments of the present disclosure, when the time unit offset is preconfigured through high-layer signaling, prior to transmitting the one or more PDSCHs in the one or more time units where the one or more PDSCHs are transmitted on the plurality of carriers, the processor is further configured to determine the one or more time units where the one or more PDSCHs are transmitted on the plurality of carriers in accordance with (i) the time unit offset and (ii) the reference SCS or the SCS of each carrier.

In some possible embodiments of the present disclosure, the time unit is a predefined time period including A symbols, a subframe, a slot or a sub-slot, where A is a positive integer.

In some possible embodiments of the present disclosure, when the one or more time units where the one or more PDSCHs are transmitted on the plurality of carriers is determined in accordance with the reference SCS or the SCS of each carrier, the PDSCH transmission method further includes determining the one or more time units where the one or more PDSCHs are transmitted on the plurality of carriers in accordance with (i) a time unit offset and (ii) the reference SCS or the SCS of each carrier.

In some possible embodiments of the present disclosure, the determining the one or more time units where the one or more PDSCHs are transmitted on the plurality of carriers in accordance with the time unit offset and the reference SCS includes determining a reference time unit on the basis of the reference SCS in accordance with the time unit where the first DCI is transmitted and the time unit offset, and determining that a PDSCH is transmitted in a time unit overlapping with the reference time unit on each carrier of the plurality of carriers, and the time unit offset is determined in accordance with the reference SCS.

In some possible embodiments of the present disclosure, when there is a plurality of time units overlapping with the reference time unit on each carrier of the plurality of carriers, the PDSCH is determined to be transmitted in each time unit or in a first or last time unit among the plurality of time units.

In some possible embodiments of the present disclosure, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

In some possible embodiments of the present disclosure, when there is a plurality of time units overlapping with the reference time unit, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the SCS of each carrier includes, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

In some possible embodiments of the present disclosure, the time unit offset is one or more time unit offsets between the first DCI and the one or more PDSCHs.

In some possible embodiments of the present disclosure, the time unit offset is a time unit interval between the time unit where the first DCI is transmitted and a time unit where the scheduled PDSCH is transmitted.

In some possible embodiments of the present disclosure, the time unit offset is determined through an indication field in the first DCI, or configured through high-layer signaling.

In some possible embodiments of the present disclosure, the time unit offset is shared by the one or more PDSCHs on the plurality of carriers.

In still yet another aspect, the present disclosure provides in some embodiments a PDSCH reception device, including: a first reception module configured to receive first DCI, the first DCI being used to schedule one or more PDSCHs on a plurality of carriers; a determination module configured to determine one or more time units where the one or more PDSCHs are transmitted on the plurality of carriers in accordance with a reference SCS or an SCS of each carrier; and a second reception module configured to receive the one or more PDSCHs in the determined one or more time units on the plurality of carriers.

In still yet another aspect, the present disclosure provides in some embodiments a PDSCH transmission device, including: a first transmission module configured to transmit first DCI, the first DCI being used to schedule one or more PDSCHs on a plurality of carriers; and a second transmission module configured to transmit the one or more PDSCHs in one or more time units where the one or more PDSCHs are transmitted on the plurality of carriers. The time unit where the one or more PDSCHs are transmitted on the plurality of carriers is determined in accordance with a reference SCS or an SCS of each carrier.

In still yet another aspect, the present disclosure provides in some embodiments a computer-readable storage medium storing therein a computer program for implementing the above-mentioned PDSCH reception method and/or the above-mentioned PDSCH transmission method.

The present disclosure has the following beneficial effects.

According to the embodiments of the present disclosure, the time unit where the one or more PDSCHs are transmitted on the plurality of carriers scheduled through the first DCI is determined in accordance with the reference SCS or the SCS of each carrier. As a result, it is able for the terminal and the base station to determine the time unit where the one or more PDSCHs are transmitted on each carrier on the basis of common understanding, thereby to transmit the PDSCH normally on the plurality of carriers scheduled through the DCI.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

In order to improve the scheduling efficiency and reduce an overhead for DCI, a plurality of carriers needs to be scheduled through one piece of DCI, i.e., the transmission of one or more PDSCHs on the plurality of carriers is scheduled by the DCI simultaneously. Considering that the plurality of carriers may have different numerologies (e.g., SCSs), there is currently no definite method for determining slots where the one or more PDSCHs are transmitted on the plurality of carriers in accordance with a same scheduling timing value (i.e., K0) notified in the DCI.

Based on the above, the present disclosure provides in some embodiments PDSCH reception and transmission schemes. When the transmission of one or more PDSCHs on a plurality of carriers is scheduled through one piece of DCI, one or more time units where the one or more PDSCHs are transmitted on each carrier are determined in accordance with a reference SCS or an SCS of each scheduled carrier. The reference SCS is an SCS corresponding to the transmission of the DCI, a maximum one of SCSs of the plurality of carriers, or a minimum one of the SCSs of the plurality of carriers.

The present disclosure will be described hereinafter in conjunction with the drawings and embodiments.

The schemes in the embodiments of the present disclosure will be described from both a terminal side and a base station side. In addition, a cooperative instance is provided so as to facilitate the understanding of the schemes in the embodiments of the present disclosure. However, it does not mean that the schemes must be implemented cooperatively or separately. In actual use, when the schemes are implemented by the terminal and the base station separately, it is also able to solve problems at the terminal side and the base station. When the schemes are adopted cooperatively, it is able to achieve a better effect.

Figure 1:
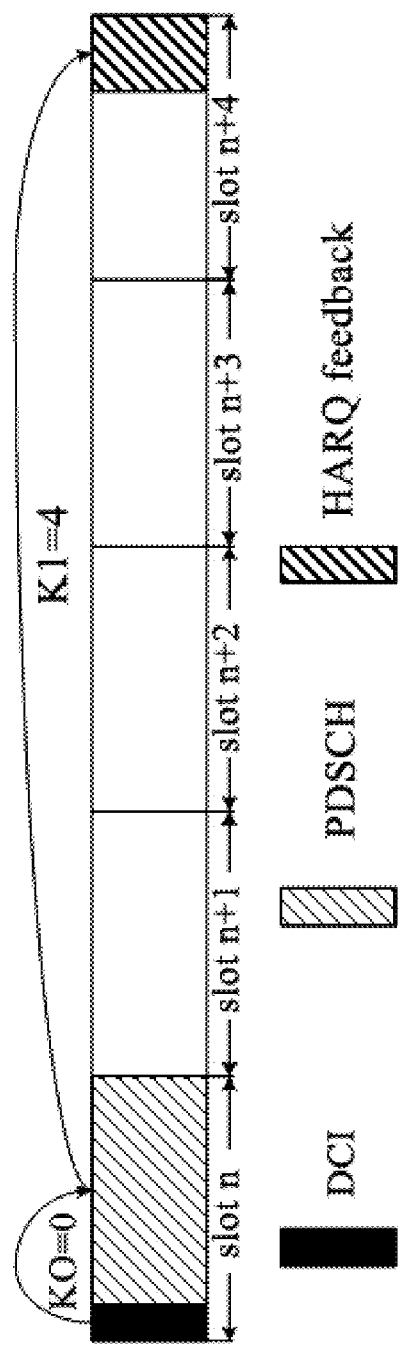
FIG. 1 is a schematic view showing downlink scheduling timing and HARQ-ACK feedback timing in the related art.
Figure 2:
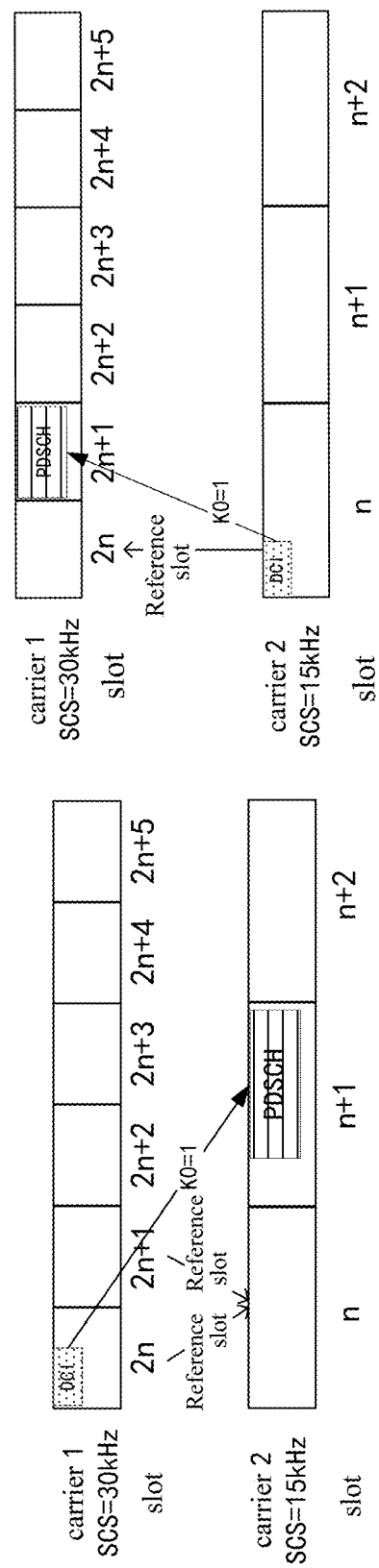
FIG. 2 is a schematic view showing the offsetting of a slot by K0 slots in the related art.
Figure 3:
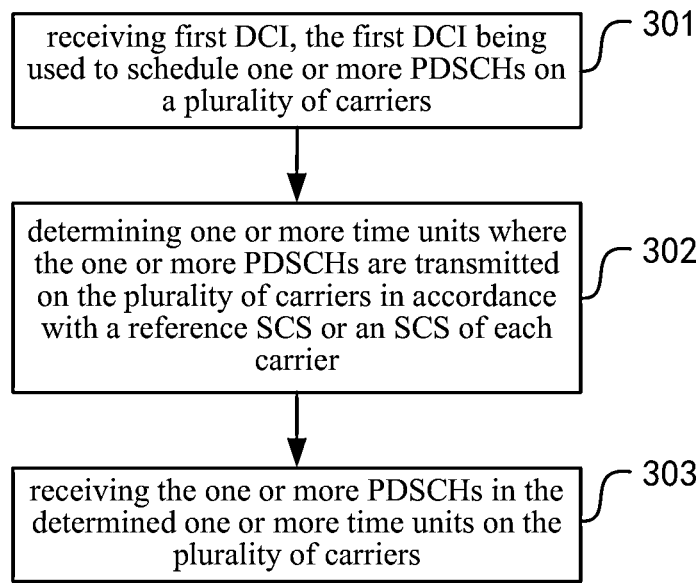
FIG. 3 is a flow chart of a PDSCH reception method at a terminal side according to one embodiment of the present disclosure.

As shown in FIG. 3, the present disclosure provides in some embodiments a PDSCH reception method at a terminal side, which includes: Step 301 of receiving first DCI, the first DCI being used to schedule one or more PDSCHs on a plurality of carriers; Step 302 of determining one or more time units where the one or more PDSCHs are transmitted on the plurality of carriers in accordance with a reference SCS or an SCS of each carrier; and Step 303 of receiving the one or more PDSCHs in the determined one or more time units on the plurality of carriers.

During the implementation, the reference SCS is an SCS corresponding to the transmission of the DCI, a maximum one of SCSs of the plurality of carriers, or a minimum one of the SCSs of the plurality of carriers.

During the implementation, the time unit is a predefined time period including A number of symbols, a subframe, a slot or a sub-slot, where A is a positive integer.

During the implementation, when the one or more time units where the one or more PDSCHs are transmitted on the plurality of carriers is determined in accordance with the reference SCS or the SCS of each carrier, the PDSCH reception method further includes determining the one or more time units where the one or more PDSCHs are transmitted on the plurality of carriers in accordance with (i) a time unit offset and (ii) the reference SCS or the SCS of each carrier.

During the implementation, the determining the one or more time units where the one or more PDSCHs are transmitted on the plurality of carriers in accordance with the time unit offset and the reference SCS includes determining a reference time unit on the basis of the reference SCS in accordance with a time unit where the first DCI is transmitted and the time unit offset, and determining that a PDSCH is transmitted within a time unit overlapping with the reference time unit on each carrier of the plurality of carriers, the time unit offset being determined in accordance with the reference SCS.

During the implementation, when there is a plurality of time units overlapping with the reference time unit on each carrier of the plurality of carriers, the PDSCH is determined to be transmitted in each time unit, or in a first or last time unit among the plurality of time units.

During the implementation, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

To be specific, in a first mode, when the reference SCS is the SCS of the first DCI, the time unit offset is determined in accordance with the SCS of the first DCI, a reference time unit is determined in accordance with the time unit where the first DCI is transmitted (i.e., the time unit determined in accordance with the SCS of the DCI on a transmission carrier) and the time unit offset (i.e., the reference time unit is a time unit on a carrier where the first DCI is transmitted), and the PDSCH is determined to be transmitted within the time unit overlapping with the reference time unit on each carrier of the plurality of carriers.

The time unit offset is in unit of a length of the time unit determined in accordance with the SCS of the first DCI. For example, when the time unit offset is 1, it means that the time unit offset includes one time unit determined in accordance with the SCS of the first DCI.

In a second mode, when the reference SCS is the maximum SCS in the SCSs of the plurality of carriers, the time unit offset is determined in accordance with the maximum SCS in the SCSs of the plurality of carriers, a time unit where the one or more PDSCHs are transmitted on a carrier with the maximum SCS (the quantity of the maximum SCSs may be one or plural, and when there is a plurality of maximum SCSs, a determined slot within which the one or more PDSCHs are transmitted on each carrier is same) in the plurality of carriers is determined in accordance with the time unit where the first DCI is transmitted (i.e., a time unit determined in accordance with the SCS of the DCI on a transmission carrier), the SCS of the first DCI, the maximum SCS and the time unit offset (i.e., the PDSCH is determined to be transmitted within the time unit on the carrier with the maximum SCS), and the PDSCH is determined to be transmitted within a time unit overlapping with the reference time unit on each carrier of the plurality of carriers other than the carrier with the maximum SCS with the time unit as a reference time unit (i.e., a time unit on a carrier with a reference SCS).

The time unit offset is in unit of a length of the time unit determined in accordance with the maximum SCS in the SCSs of the plurality of carriers. For example, when the time unit offset is 1, it means that the time unit offset includes one time unit determined in accordance with the maximum SCS in the SCSs of the plurality of carriers.

In a third mode, when the reference SCS is the minimum SCS in the SCSs of the plurality of carriers, the time unit offset is determined in accordance with the minimum SCS in the SCSs of the plurality of carriers, a time unit where the one or more PDSCHs are transmitted on a carrier with the minimum SCS (the quantity of the maximum SCSs may be one or plural, and when there is a plurality of maximum SCSs, a determined slot within which the one or more PDSCHs are transmitted on each carrier is same) in the plurality of carriers is determined in accordance with the time unit where the first DCI is transmitted (i.e., a time unit determined in accordance with the SCS of the DCI on a transmission carrier), the SCS of the first DCI, the minimum SCS and the time unit offset (i.e., the PDSCH is determined to be transmitted in the time unit on the carrier with the minimum SCS), and the PDSCH is determined to be transmitted within a time unit overlapping with the reference time unit on each carrier of the plurality of carriers other than the carrier with the minimum SCS with the time unit as a reference time unit (i.e., a time unit on a carrier with a reference SCS).

The time unit offset is in unit of a length of the time unit determined in accordance with the minimum SCS in the SCSs of the plurality of carriers. For example, when the time unit offset is 1, it means that the time unit offset includes one time unit determined in accordance with the minimum SCS in the SCSs of the plurality of carriers.

During the implementation, when there is a plurality of time units overlapping with the reference time unit, the PDSCH is determined to be transmitted in each time unit, or in a first or last time unit among the plurality of time units.

To be specific, in the first and third modes, when there is a plurality of time units overlapping with the reference time unit, the PDSCH is determined to be transmitted in each time unit, or in a first or last time unit among the plurality of time units.

Actually, when the reference SCS is the SCS of the first DCI or when the reference SCS is the minimum SCS in the SCSs of the plurality of carriers, there may exist a plurality of time units overlapping with the reference time unit when the two conditions are met.

In other words, when the reference SCS is the SCS of the first DCI or the reference SCS is the minimum SCS in the SCSs of the plurality of carriers, there may exist a plurality of time units overlapping with the reference time unit on a certain carrier. At this time, the PDSCH is determined to be transmitted in each time unit, or in the first or last time unit.

During the implementation, the determining the one or more time units where the one or more PDSCHs are transmitted on the plurality of carriers in accordance with the time unit offset and the SCS of each carrier includes, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

During the implementation, the time unit offset is one or more time unit offsets between the first DCI and the one or more PDSCHs.

During the implementation, the time unit offset is a time unit interval between the time unit where the first DCI is transmitted and a time unit where the scheduled PDSCH is transmitted.

To be specific, the time unit offset includes a time unit offset between the first DCI and the scheduled PDSCH, particularly a time unit interval between the time unit where the first DCI is transmitted and a time unit where the scheduled PDSCH is transmitted.

During the implementation, the time unit offset is determined through an indication field in the first DCI, or configured through high-layer signaling.

During the implementation, the time unit offset is shared by the one or more PDSCHs on the plurality of carriers.

During the implementation, the receiving the one or more PDSCHs in the determined one or more time units on the plurality of carriers includes: determining a set of time-domain symbols for a PDSCH in a determined time unit on each carrier of the plurality of carriers in accordance with a start symbol and a transmission length determined in accordance with an indication field in the first DCI; and receiving the PDSCH in the determined set of time-domain symbols.

Figure 4:
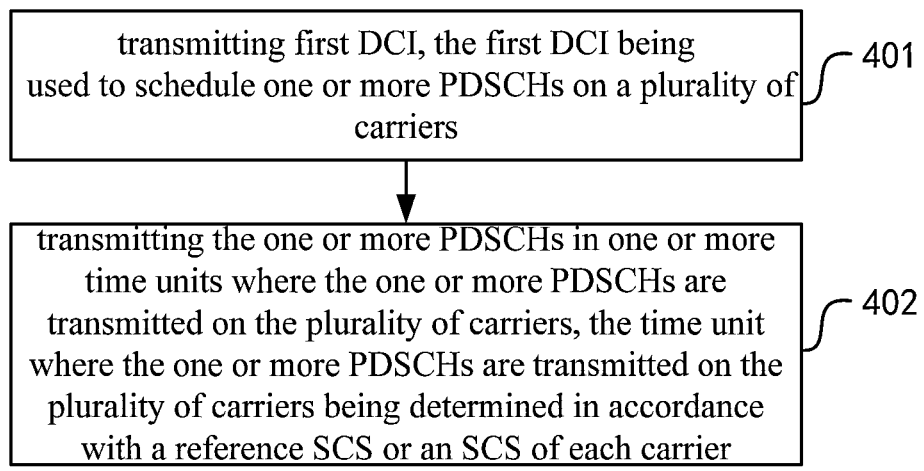
FIG. 4 is a flow chart of a PDSCH transmission method at a base station side according to one embodiment of the present disclosure.

As shown in FIG. 4, the present disclosure provides in some embodiments a PDSCH transmission method at a base station side which includes: Step 401 of transmitting first DCI, the first DCI being used to schedule one or more PDSCHs on a plurality of carriers; and Step 402 of transmitting the one or more PDSCHs in one or more time units where the one or more PDSCHs are transmitted on the plurality of carriers. The one or more time units where the one or more PDSCHs are transmitted on the plurality of carriers are determined in accordance with a reference SCS or an SCS of each carrier.

During the implementation, the reference SCS is an SCS corresponding to the transmission of the DCI, a maximum one of SCSs of the plurality of carriers, or a minimum one of the SCSs of the plurality of carriers.

During the implementation, the time unit is a predefined time period including A symbols, a subframe, a slot or a sub-slot, where A is a positive integer.

During the implementation, the transmitting the one or more PDSCHs in the one or more time units where the one or more PDSCHs are transmitted on the plurality of carriers includes transmitting, in the one or more time units where the one or more PDSCHs are transmitted, the PDSCH in a set of time-domain symbols including a start symbol and a transmission length indicated through an indication field in the first DCI on each carrier of the plurality of carriers.

During the implementation, when the one or more time units where the one or more PDSCHs are transmitted on the plurality of carriers is determined in accordance with the reference SCS or the SCS of each carrier, the PDSCH transmission method further includes determining the one or more time units where the one or more PDSCHs are transmitted on the plurality of carriers in accordance with (i) a time unit offset and (ii) the reference SCS or the SCS of each carrier.

During the implementation, when a time unit offset is indicated through the indication field in the first DCI, prior to transmitting the first DCI, the PDSCH transmission method further includes determining one or more time units where the one or more PDSCHs scheduled through the first DCI on the plurality of carriers are transmitted on each carrier, and determining the time unit offset indicated in the first DCI in accordance with (i) the time unit and (ii) the reference SCS or the SCS of each carrier of the plurality of carriers.

During the implementation, when the time unit offset is preconfigured through high-layer signaling, prior to transmitting the one or more PDSCHs in the one or more time units where the one or more PDSCHs are transmitted on the plurality of carriers, the PDSCH transmission method further includes determining the one or more time units where the one or more PDSCHs are transmitted on the plurality of carriers in accordance with (i) the time unit offset and (ii) the reference SCS or the SCS of each carrier.

To be specific, when the time unit offset is preconfigured through high-layer signaling (e.g., Radio Resource Control (RRC) signaling), prior to transmitting the one or more PDSCHs in the one or more time units where the one or more PDSCHs are transmitted on the plurality of carriers, the PDSCH transmission method further includes determining the one or more time units where the one or more PDSCHs are transmitted on the plurality of carriers in accordance with (i) the time unit offset and (ii) the reference SCS or the SCS of each carrier.

During the implementation, the determining the one or more time units where the one or more PDSCHs are transmitted on the plurality of carriers in accordance with the time unit offset and the reference SCS includes determining a reference time unit on the basis of the reference SCS in accordance with the time unit where the first DCI is transmitted and the time unit offset, and determining that a PDSCH is transmitted in a time unit overlapping with the reference time unit on each carrier of the plurality of carriers, and the time unit offset is determined in accordance with the reference SCS.

During the implementation, when there is a plurality of time units overlapping with the reference time unit on each carrier of the plurality of carriers, the PDSCH is determined to be transmitted in each time unit or in a first or last time unit among the plurality of time units.

During the implementation, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

To be specific, in a first mode, when the reference SCS is the SCS of the first DCI, the time unit offset is determined in accordance with the SCS of the first DCI, a reference time unit is determined in accordance with the time unit where the first DCI is transmitted (i.e., the time unit determined in accordance with the SCS of the DCI on a transmission carrier) and the time unit offset (i.e., the reference time unit is a time unit on a carrier where the first DCI is transmitted), and the PDSCH is determined to be transmitted within the time unit overlapping with the reference time unit on each carrier of the plurality of carriers.

The time unit offset is in unit of a length of the time unit determined in accordance with the SCS of the first DCI. For example, when the time unit offset is 1, it means that the time unit offset includes one time unit determined in accordance with the SCS of the first DCI.

In a second mode, when the reference SCS is the maximum SCS in the SCSs of the plurality of carriers, the time unit offset is determined in accordance with the maximum SCS in the SCSs of the plurality of carriers, a time unit where the PDSCH is transmitted on a carrier with the maximum SCS (the quantity of the maximum SCSs may be one or plural, and when there is a plurality of maximum SCSs, a determined slot within which the PDSCH is transmitted on each carrier is same) in the plurality of carriers is determined in accordance with the time unit where the first DCI is transmitted (i.e., a time unit determined in accordance with the SCS of the DCI on a transmission carrier), the SCS of the first DCI, the maximum SCS and the time unit offset (i.e., the PDSCH is determined to be transmitted within the time unit on the carrier with the maximum SCS), and the PDSCH is determined to be transmitted within a time unit overlapping with the reference time unit on each carrier of the plurality of carriers other than the carrier with the maximum SCS with the time unit as a reference time unit (i.e., a time unit on a carrier with a reference SCS).

The time unit offset is in unit of a length of the time unit determined in accordance with the maximum SCS in the SCSs of the plurality of carriers. For example, when the time unit offset is 1, it means that the time unit offset includes one time unit determined in accordance with the maximum SCS in the SCSs of the plurality of carriers.

In a third mode, when the reference SCS is the minimum SCS in the SCSs of the plurality of carriers, the time unit offset is determined in accordance with the minimum SCS in the SCSs of the plurality of carriers, a time unit where the PDSCH is transmitted on a carrier with the minimum SCS (the quantity of the maximum SCSs may be one or plural, and when there is a plurality of maximum SCSs, a determined slot within which the PDSCH is transmitted on each carrier is same) in the plurality of carriers is determined in accordance with the time unit where the first DCI is transmitted (i.e., a time unit determined in accordance with the SCS of the DCI on a transmission carrier), the SCS of the first DCI, the minimum SCS and the time unit offset (i.e., the PDSCH is determined to be transmitted in the time unit on the carrier with the minimum SCS), and the PDSCH is determined to be transmitted within a time unit overlapping with the reference time unit on each carrier of the plurality of carriers other than the carrier with the minimum SCS with the time unit as a reference time unit (i.e., a time unit on a carrier with a reference SCS).

The time unit offset is in unit of a length of the time unit determined in accordance with the minimum SCS in the SCSs of the plurality of carriers. For example, when the time unit offset is 1, it means that the time unit offset includes one time unit determined in accordance with the minimum SCS in the SCSs of the plurality of carriers.

During the implementation, when there is a plurality of time units overlapping with the reference time unit, the PDSCH is determined to be transmitted in each time unit, or in a first or last time unit among the plurality of time units.

To be specific, in the first and third modes, when there is a plurality of time units overlapping with the reference time unit, the PDSCH is determined to be transmitted in each time unit, or in a first or last time unit among the plurality of time units.

Actually, when the reference SCS is the SCS of the first DCI or when the reference SCS is the minimum SCS in the SCSs of the plurality of carriers, there may exist a plurality of time units overlapping with the reference time unit when the two conditions are met.

In other words, when the reference SCS is the SCS of the first DCI or the reference SCS is the minimum SCS in the SCSs of the plurality of carriers, there may exist a plurality of time units overlapping with the reference time unit on a certain carrier. At this time, the PDSCH is determined to be transmitted in each time unit, or in the first or last time unit.

During the implementation, the determining the one or more time units where the one or more PDSCHs are transmitted on the plurality of carriers in accordance with the time unit offset and the SCS of each carrier includes a fourth mode of, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

During the implementation, the time unit offset is one or more time unit offsets between the first DCI and the one or more PDSCHs.

During the implementation, the time unit offset is a time unit interval between the time unit where the first DCI is transmitted and a time unit where the scheduled PDSCH is transmitted.

During the implementation, the time unit offset is determined through an indication field in the first DCI, or configured through high-layer signaling.

During the implementation, the time unit offset is shared by the one or more PDSCHs on the plurality of carriers.

In the implementation regarding the time unit where the PDSCH is transmitted and the time unit offset, behaviors at the base station are equivalent to those at the terminal.

To be specific, when the time unit offset is notified through DCI, in one implementation mode, the base station determines by itself the time unit where the PDSCH is transmitted on each carrier, and determines by itself a time unit where the first DCI is transmitted. The base station determines the time unit offset between the first DCI and the scheduled PDSCH in accordance with the determined time unit where the first DCI is transmitted and the time unit where the scheduled PDSCH is transmitted, and sets a corresponding indication field in the first DCI to be in a status to indicate the time unit offset, so that the time unit offset for determining the time unit where the PDSCH is transmitted is indicated in the DCI to the terminal. The terminal does not know where the first DCI and the scheduled PDSCH are to be transmitted by the base station, so it needs to detect the first DCI in an opportunity for transmitting the DCI. When the first DCI has been detected, the terminal infers the time unit where the PDSCH is transmitted in a predefined scheduling timing in accordance with the time unit offset indicated in the first DCI and the time unit where the first DCI is received (i.e., the terminal determines the time unit where the PDSCH is transmitted on the plurality of carriers in accordance with the time unit offset, and the reference SCS or the SCS of each scheduled carrier as mentioned hereinabove). Hence, a behavior of the base station is different from a behavior of the terminal when determining the time unit where the PDSCH is transmitted. The base station does not need to determine the time unit in a mode completely identical to that at the terminal. Instead, on the basis of the mode of determining, by the terminal, the time unit where the PDSCH is transmitted, the base station infers the time unit offset in accordance with the determined time unit where the first DCI is transmitted and the time unit where the PDSCH is transmitted, and then notifies it to the terminal.

For example, when the above-mentioned first mode is adopted by the terminal, the behavior at the base station side will be described as follows. When the reference SCS is the SCS of the first DCI, the time unit offset is determined in accordance with the SCS of the first DCI, and the base station finds a time unit defined in accordance with the SCS of the first DCI and overlapping with the determined time units where the PDSCH is transmitted on the plurality of scheduled carriers as a reference time unit in accordance with these time units, determines the time unit offset between the first DCI and the reference time unit, and notifies the time unit offset to the terminal, so as to help the terminal to determine, in the above-mentioned first mode, that the PDSCH is transmitted in the time unit overlapping with the reference time unit on each carrier of the plurality of scheduled carriers.

For example, when the above-mentioned second mode is adopted by the terminal, the behavior at the base station side will be described as follows. When the reference SCS is the maximum SCS in the SCSs of the plurality of carriers, the time unit offset is determined in accordance with the maximum SCS in the SCSs of the plurality of carriers, and the base station finds a time unit defined in accordance with the maximum SCS and overlapping with the determined time unit where the PDSCH is transmitted on each carrier (e.g., a time unit on a carrier with the maximum SCS) as a reference time unit in accordance with the time unit where the PDSCH is transmitted on each carrier, determines the time unit offset between the first DCI and the reference time unit, and notifies the time unit offset to the terminal, so as to help the terminal to determine, in the above-mentioned second mode, that the PDSCH is transmitted in the time unit overlapping with the reference time unit on each carrier of the plurality of scheduled carriers.

For example, when the above-mentioned third mode is adopted by the terminal, the behavior at the base station side will be described as follows. When the reference SCS is the minimum SCS in the SCSs of the plurality of carriers, the time unit offset is determined in accordance with the minimum SCS in the SCSs of the plurality of carriers, and the base station finds a time unit defined in accordance with the minimum SCS and overlapping with the determined time unit where the PDSCH is transmitted on each carrier (e.g., a time unit on a carrier with the minimum SCS) as a reference time unit in accordance with the time unit where the PDSCH is transmitted on each carrier, determines the time unit offset between the first DCI and the reference time unit, and notifies the time unit offset to the terminal, so as to help the terminal to determine, in the above-mentioned third mode, that the PDSCH is transmitted in the time unit overlapping with the reference time unit on each carrier of the plurality of scheduled carriers.

For example, when the above-mentioned fourth mode is adopted by the terminal, the behavior at the base station side will be described as follows. With respect to each carrier in the plurality of carriers, the time unit offset is determined in accordance with an SCS of a current carrier, and the base station determines, on each carrier, a common time unit for the plurality of carriers in accordance with such information as a slot interval between the time unit where the first DCI is transmitted and the first DCI, the SCS, and so forth, and notifies the time unit offset to the terminal, so as to help the terminal to determine, in the above-mentioned fourth mode, that the PDSCH is transmitted in the time unit overlapping with the reference time unit on each carrier of the plurality of scheduled carriers.

In another implementation mode, the base station determines by itself the time unit offset, determines by itself a time unit where the first DCI is to be transmitted, and then determines the time unit where the PDSCH is transmitted on the plurality of carriers in accordance with the time unit offset, and the reference SCS or the SCS of each scheduled carrier like that at the terminal side. The base station sets a corresponding indication field in the first DCI to be in a status for indicating the time unit offset, so that the time unit offset for determining the time unit where the PDSCH is transmitted in indicated in the first DCI to the terminal. The terminal does not know where the first DCI and the scheduled PDSCH are to be transmitted by the base station, so it needs to detect the first DCI in an opportunity for transmitting the DCI. When the first DCI has been detected, the terminal infers the time unit where the PDSCH is transmitted in a predefined scheduling timing in accordance with the time unit offset indicated in the first DCI and the time unit where the first DCI is received (i.e., the terminal determines the time unit where the PDSCH is transmitted on the plurality of carriers in accordance with the time unit offset, and the reference SCS or the SCS of each scheduled carrier as mentioned hereinabove). Hence, a behavior of the base station is different from a behavior of the terminal when determining the time unit where the PDSCH is transmitted. The base station does not need to determine the time unit in a mode completely identical to that at the terminal. Instead, the base station determines by itself the time unit offset and notifies it to the terminal. The terminal needs to obtain the time unit offset through a notification from the base station.

For example, when the above-mentioned first to fourth modes are adopted by the terminal, the behavior at the base station side will be described as follows. The base station determines by itself the time unit offset, and then determines the time unit where the PDSCH is transmitted on the scheduled carrier in accordance with the time unit where the first DCI is transmitted completely using the first to fourth modes at the terminal side, so as to transmit the PDSCH in the corresponding time unit.

When the time unit offset is a constant value preconfigured through high-layer signaling, the base station does not need to determine the time unit offset and notify it to the terminal through the DCI. The time unit offset is known to both the base station and the terminal, so the base station and the terminal determine a transmission position of the PDSCH in accordance with the known time unit offset. However, the base station may still adjust the time unit where the PDSCH is transmitted merely through adjusting the time unit where the first DCI is transmitted. To be specific, after determining the time unit where the first DCI is transmitted, the base station determines the time unit where the PDSCH is transmitted on each carrier in accordance with the time unit where the first DCI is transmitted and the time unit offset in a same mode of determining, by the base station itself, the time unit offset (and the first to fourth modes at the terminal side). The terminal needs to find the time unit where the PDSCH is transmitted on each carrier in the above-mentioned first to fourth modes in accordance with the time unit where the first DCI is received and the known time unit offset.

The following description will be given in conjunction with the embodiments.

It is presumed that, there is one piece of DCI within a slot 2k on a carrier 1 for scheduling the transmission of the PDSCH on the carrier 1 and a carrier 2. The TDRA indication field in the DCI indicates a start symbol (e.g., a first symbol or a symbol with an index number 0), a transmission length (e.g., eight symbols) and K0=1. An SCS of the carrier 1 is 30 kHz, and an SCS of the carrier 2 is 15 kH. When one time unit is defined as one slot, the following description will be given.

1. First Mode

In this mode, the SCS of the DCI serves as a reference SCS, and K0 is in unit of a slot of 30 kHz, i.e., K0=1 represents a length of one slot on a carrier with a 30 kHz SCS.

Base Station Side

When a piece of DCI is desired to be transmitted within the slot 2k to schedule the transmission of the PDSCH within a slot 2k+1 on the carrier 1 and within a slot k on the carrier 2, similar to the mode of determining, by the terminal, the slot where the PDSCH is transmitted (i.e., for the SCS of the carrier 1, a reference slot corresponding to the slot where the PDSCH is transmitted on the carrier 1 and the carrier 2 is the slot 2k+1 on the carrier 1, and the slot 2k+1 on the carrier 1 is spaced apart from a slot where the DCI is transmitted on the carrier 1 by one slot), the base station determines that K0=1 needs to be indicated, sets a TDRA indication field in the DCI to indicate a combination where a start symbol is a first symbol, a transmission length is eight(8) symbols and K0=1, and transmits the DCI carrying the TDRA indication to the terminal in the slot 2k on the carrier 1. In addition, the base station further transmits the PDSCH on first to eight symbols within the slot 2k+1 on the carrier 1 and on first to eight symbols within the slot k on the carrier 2 in accordance with the time-domain resource assignment.

Terminal Side

Figure 5:
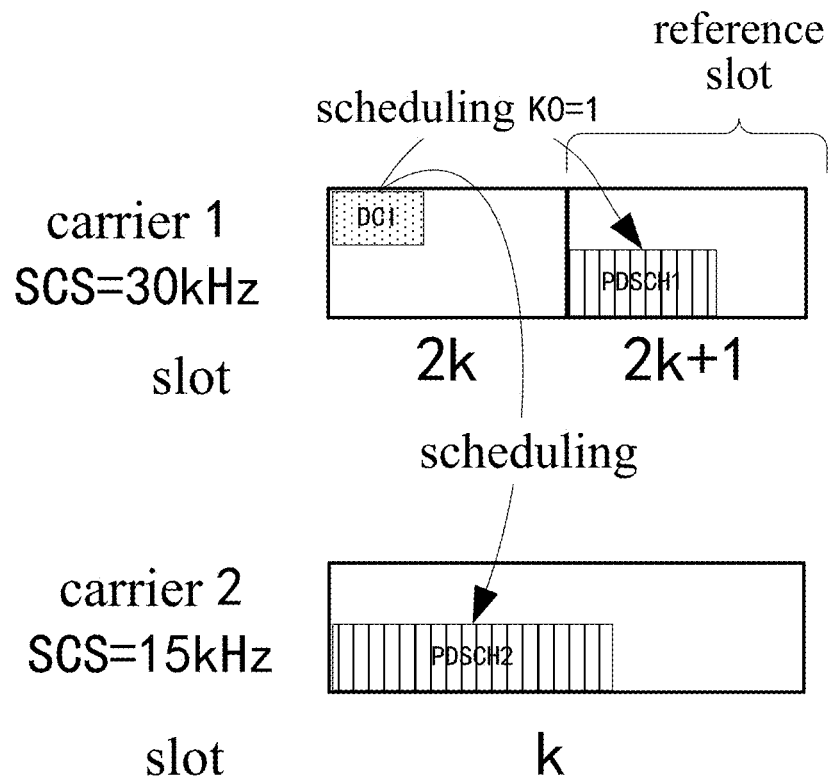
FIG. 5 is a first schematic view showing a DCI scheduling slot according to one embodiment of the present disclosure.

The terminal determines that a reference slot on the carrier 1 (the carrier where the DCI is transmitted) is a slot 2k+K0, i.e., 2k+1, in accordance with the slot 2k where the DCI is transmitted and K0, determines a slot on the carrier 1 overlapping with the reference slot, i.e., the slot 2k+1 on the carrier 1 (because the carrier 1 is a carrier where the DCI is transmitted), and determines that the PDSCH scheduled on the carrier 1 is transmitted within the slot 2k+1 on the carrier 1. The terminal further determines that a specific time-domain position is first to eight symbols within the slot 2k+1 on the carrier 1 in accordance with a Start and Length Indicator Value (SLIV) in the TDRA indicated in the DCI, determines a slot on the carrier 2 overlapping with the reference slot, i.e., the slot k on the carrier 2, and determines that the PDSCH scheduled on the carrier 2 is transmitted within the slot k on the carrier 2. The terminal further determines that a specific time-domain position is first to eight symbols within the slot k on the carrier 2 in accordance with the SLIV in the TDRA indicated in the DCI. FIG. 5 shows DCI scheduling slots. The terminal receives the PDSCH on the first to eight symbols within the slot 2k+1 on the carrier 1 and the first to eight symbols within the slot k on the carrier 2.

2. Second Mode

In this mode, a maximum SCS in the SCSs of the carrier 1 and the carrier 2 serves as a reference SCS (the SCS of the carrier 1), and K0 is in unit of a slot of 30 kHz, i.e., K0=1 represents a length of one slot on a carrier with a 30 kHz SCS.

Base Station Side

When a piece of DCI is desired to be transmitted within the slot 2k to schedule the transmission of the PDSCH within a slot 2k+1 on the carrier 1 and within a slot k on the carrier 2, similar to the mode of determining, by the terminal, the slot where the PDSCH is transmitted (i.e., for the SCS of the carrier 1, a reference slot corresponding to the slot where the PDSCH is transmitted on the carrier 1 and the carrier 2 is the slot 2k+1 on the carrier 1, and the slot 2k+1 on the carrier 1 is spaced apart from a slot where the DCI is transmitted on the carrier 1 by one slot), the base station determines that K0=1 needs to be indicated, sets a TDRA indication field in the DCI to indicate a combination where a start symbol is a first symbol, a transmission length is eight symbols and K0=1, and transmits the DCI carrying the TDRA indication to the terminal in the slot 2k on the carrier 1. In addition, the base station further transmits the PDSCH on first to eight symbols within the slot 2k+1 on the carrier 1 and on first to eight symbols within the slot k on the carrier 2 in accordance with the time-domain resource assignment.

Terminal Side

The terminal determines that the SCS of the carrier 1 is maximum, and then determines, with the scheduled carrier 1 as a reference, that a slot where the scheduled PDSCH is transmitted on the carrier 1 is a slot $$\left\lfloor 2k \cdot \frac{2^1}{2^1} \right\rfloor + 1 = 2k + 1$$

on the carrier 1 through a formula $$\left\lfloor n \cdot \frac{2^{\mu_{PDSCH}}}{2^{\mu_{PDCCH}}} \right\rfloor + K_0$$

in accordance with the slot 2k where the DCI is transmitted, K0, the SCS ($\mu_{PDCCH}=1$) of the DCI and the SCS ($\mu_{PDSCH}=1$) of the scheduled PDSCH on the carrier 1. Actually, the DCI is transmitted on the carrier 1, so the SCS of the DCI is the same as the SCS of the scheduled PDSCH on the carrier 1, and $$\left\lfloor n \cdot \frac{2^{\mu_{PDSCH}}}{2^{\mu_{PDCCH}}} \right\rfloor = n.$$

Hence, the slot where the PDSCH is transmitted may also be directly determined in accordance with the slot 2k where the DCI is transmitted and K1. The terminal further determines that a specific time-domain position is first to eight symbols within the slot 2k+1 on the carrier 1 in accordance with an SLIV in the TDRA indicated in the DCI. With the slot 2k+1 where the scheduled PDSCH is transmitted on the carrier 1 as a reference slot, the terminal determines a slot on the carrier without the maximum SCS in the scheduled carriers (i.e., the carrier 2) overlapping with the reference slot, i.e., the slot k on the carrier 2, and then determines that the PDSCH scheduled on the carrier 2 is transmitted within the slot k on the carrier 2. The terminal further determines that a specific time-domain position is first to eight symbols in the slot k on the carrier 2 in accordance with the SLIV in the TDRA indicated in the DCI. FIG. 5 shows the DCI scheduling slots. As shown in FIG. 5, the terminal receives the PDSCH on the first to eight symbols in the slot 2k+1 on the carrier 1 and the first to eight symbols in the slot k on the carrier 2.

3. Third Mode

In this mode, a minimum SCS in the SCSs of the carrier 1 and the carrier 2 serves as a reference SCS (the SCS of the carrier 2), and K0 is in unit of a slot of 15 kHz, i.e., K0=1 represents a length of one slot on a carrier with a 15 kHz SCS.

(1) Sub-Mode 1

When there is, as pre-agreed, a plurality of slots on the other carrier overlapping with the reference slot determined in accordance with the reference SCS, the PDSCH is determined to be transmitted within a last slot.

Base Station Side

When a piece of DCI is desired to be transmitted within the slot 2k to schedule the transmission of the PDSCH within a slot 2k+3 on the carrier 1 and within a slot k+1 on the carrier 2, similar to the mode of determining, by the terminal, the slot where the PDSCH is transmitted (i.e., based on a scheduling timing design $$\left\lfloor n \cdot \frac{2^{\mu_{PDSCH}}}{2^{\mu_{PDCCH}}} \right\rfloor + K_0,$$

for scheduling the PDSCH ($\mu_{PDSCH}$=0) on the carrier 2 through the DCI ($\mu_{PDCCH}$=1) on the carrier 1, and it may be determined that, when K0=1 indicates that the DCI on the carrier 1 is capable of scheduling the PDSCH within the slot k+1 on the carrier 2 and the slot k+1 on the carrier 2 serves as the reference slot, a slot 2k+3 on the carrier 1 is a last slot overlapping with the reference slot, so the PDSCH on the carrier 2 is transmitted within the slot 2k+3), the base station determines that K0=1 needs to be indicated, sets a TDRA indication field in the DCI to indicate a combination where a start symbol is a first symbol, a transmission length is eight symbols and K0=1, and transmits the DCI carrying the TDRA indication to the terminal in the slot 2k on the carrier 1. In addition, the base station further transmits the PDSCH on first to eight symbols within the slot 2k+3 on the carrier 1 and on first to eight symbols within the slot k+1 on the carrier 2 in accordance with the time-domain resource assignment.

Terminal Side

Figure 6:
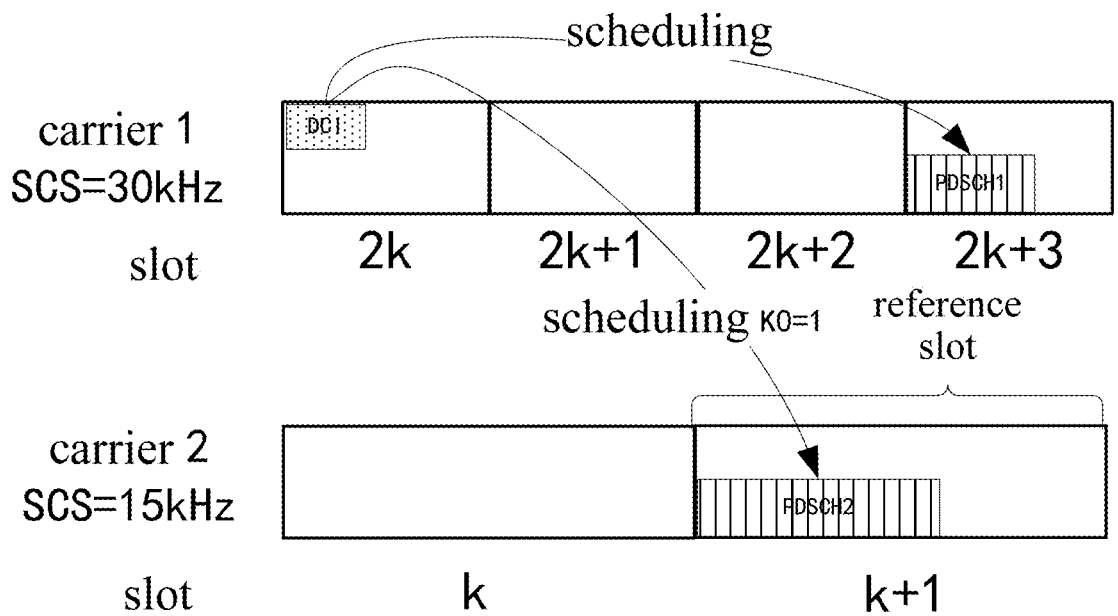
FIG. 6 is a second schematic view showing the DCI scheduling slot according to one embodiment of the present disclosure.

The terminal determines that the SCS of the carrier 2 is minimum, and then determines, with the scheduled carrier 2 as a reference, that a slot where the scheduled PDSCH is transmitted on the carrier 2 is a slot $$\left\lfloor 2k \cdot \frac{2^0}{2^1} \right\rfloor + 1 = k + 1$$

on the carrier 2 through a formula $$\left\lfloor n \cdot \frac{2^{\mu_{PDSCH}}}{2^{\mu_{PDCCH}}} \right\rfloor + K_0$$

in accordance with the slot 2k where the DCI is transmitted, K0, the SCS ($\mu_{PDCCH}$=1) of the DCI and the SCS ($\mu_{PDSCH}$=0) of the scheduled PDSCH on the carrier 2. The terminal further determines that a specific time-domain position is first to eight symbols within the slot k+1 on the carrier 2 in accordance with an SLIV in the TDRA indicated in the DCI. With the slot k+1 where the scheduled PDSCH is transmitted on the carrier 2 as a reference slot, the terminal determines a last slot on the carrier without the minimum SCS in the scheduled carriers (i.e., the carrier 1) overlapping with the reference slot, i.e., the slot 2k+3 on the carrier 1, and then determines that the PDSCH scheduled on the carrier 1 is transmitted within the slot 2k+3 on the carrier 1. The terminal further determines that a specific time-domain position is first to eight symbols in the slot 2k+3 on the carrier 1 in accordance with the SLIV in the TDRA indicated in the DCI. FIG. 6 shows the DCI scheduling slots. The terminal receives the PDSCH on the first to eight symbols in the slot 2k+3 on the carrier 1 and the first to eight symbols in the slot k+1 on the carrier 2.

(2) Sub-Mode 2

Figure 7:
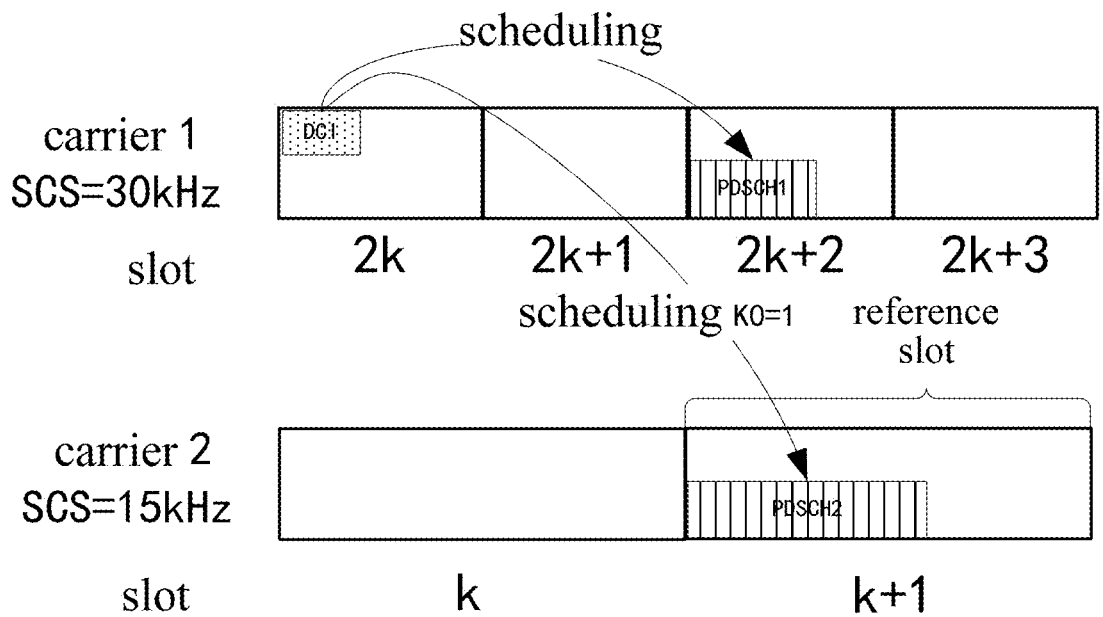
FIG. 7 is a third schematic view showing the DCI scheduling slot according to one embodiment of the present disclosure.

When there is, as pre-agreed, a plurality of slots on the other carrier overlapping with the reference slot determined in accordance with the reference SCS, the PDSCH is determined to be transmitted within a first slot. A specific procedure is similar to that in sub-mode 1, and thus will not be particularly defined herein. Mode 2 differs from mode 1 in that the first slot on the carrier 1 overlapping with the reference slot k+1 on the carrier 2 is a slot 2k+2, i.e., the PDSCH scheduled on the carrier 1 is transmitted within the slot 2k+2. FIG. 7 shows the DCI scheduling slots.

(3) Sub-Mode 3

Figure 8:
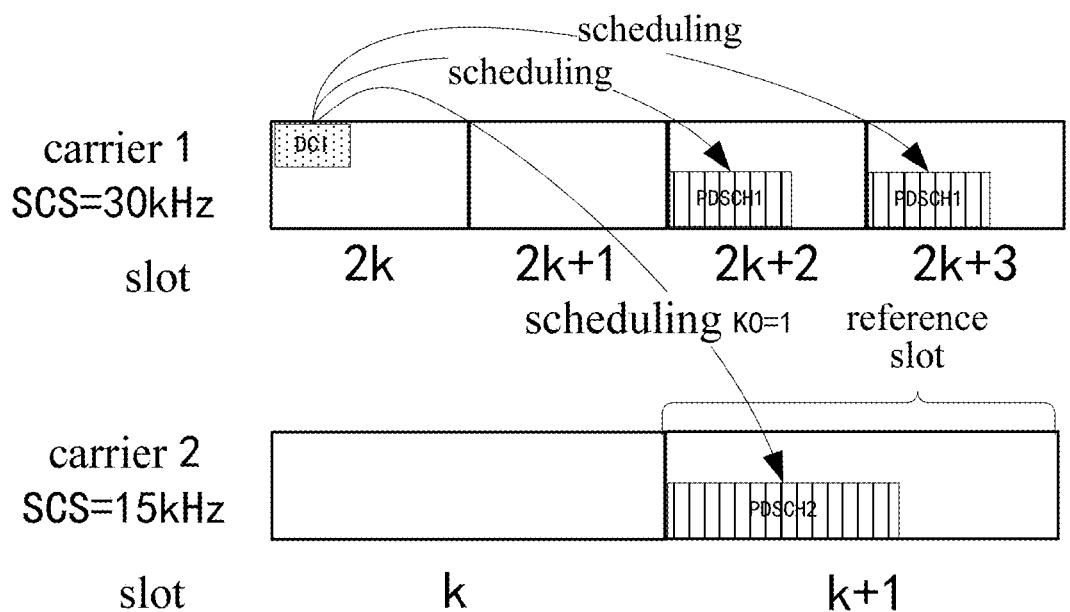
FIG. 8 is a fourth schematic view showing the DCI scheduling slot according to one embodiment of the present disclosure.

When there is, as pre-agreed, a plurality of slots on the other carrier overlapping with the reference slot determined in accordance with the reference SCS, the PDSCH is determined to be transmitted within each slot. A specific procedure is similar to that in sub-mode 1, and thus will not be particularly defined herein. Mode 4 differs from mode 1 in that the slots on the carrier 1 overlapping with the reference slot k+1 on the carrier 2 are slots 2k+2 and 2k+3, i.e., the PDSCH scheduled on the carrier 1 is transmitted within the slots 2k+2 and 2k+3. FIG. 8 shows the DCI scheduling slots.

4. Fourth Mode

In this mode, with respect to each of the carrier 1 and the carrier 2, the slot where the PDSCH is transmitted on the carrier 1 and the carrier 2 is determined in accordance with the SCS of each of the carrier 1 and the carrier 2 using a conventional scheduling timing design for scheduling the PDSCH through the PDCCH.

Base Station Side

When a piece of DCI is desired to be transmitted within the slot 2k to schedule the transmission of the PDSCH within a slot 2k+1 on the carrier 1 and within a slot k+1 on the carrier 2, based on the scheduling timing design (i.e., $$\left\lfloor n \cdot \frac{2^{\mu_{PDSCH}}}{2^{\mu_{PDCCH}}} \right\rfloor + K_0,$$

and it may be determined that when K0=1, the slot 2k+1 on the carrier 1 and the slot k+1 on the carrier 2 are capable of being scheduled in accordance with values of $\mu_{PDSCH}$ and $\mu_{PDCCH}$ on each carrier), the base station determines that K0=1 needs to be indicated, sets a TDRA indication field in the DCI to indicate a combination where a start symbol is a first symbol, a transmission length is eight symbols and K0=1, and transmits the DCI carrying the TDRA indication to the terminal in the slot 2k on the carrier 1. In addition, the base station further transmits the PDSCH on first to eight symbols within the slot 2k+1 on the carrier 1 and on first to eight symbols within the slot k+1 on the carrier 2 in accordance with the time-domain resource assignment.

Terminal Side

The terminal determines that a slot where the scheduled PDSCH is transmitted on the carrier 1 is a slot $$\left\lfloor 2k \cdot \frac{2^1}{2^1} \right\rfloor + 1 = 2k + 1$$

on the carrier 1 through a formula $$\left\lfloor n \cdot \frac{2^{\mu_{PDSCH}}}{2^{\mu_{PDCCH}}} \right\rfloor + K_0$$

in accordance with the slot 2k where the DCI is transmitted, K0, the SCS ($\mu_{PDCCH}$=1) of the DCI and the SCS ($\mu_{PDSCH}$=1) of the scheduled PDSCH on the carrier 1. Actually, the DCI is transmitted on the carrier 1, so the SCS of the DCI is the same as the SCS of the scheduled PDSCH on the carrier 1, and $$\left\lfloor n \cdot \frac{2^{\mu_{PDSCH}}}{2^{\mu_{PDCCH}}} \right\rfloor = n.$$

Figure 9:
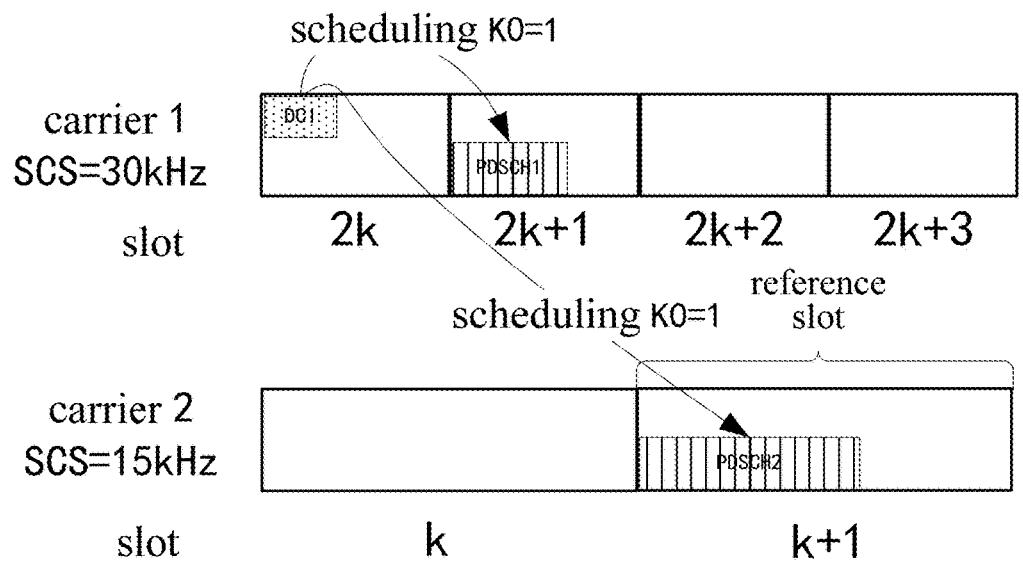
FIG. 9 is a fifth schematic view showing the DCI scheduling slot according to one embodiment of the present disclosure.

Hence, the slot where the PDSCH is transmitted may also be directly determined in accordance with the slot 2k where the DCI is transmitted and K1. The terminal further determines that a specific time-domain position is first to eight symbols within the slot 2k+1 on the carrier 1 in accordance with an SLIV in the TDRA indicated in the DCI. The terminal determines that a slot where the scheduled PDSCH is transmitted on the carrier 2 is a slot $$\left\lfloor 2k \cdot \frac{2^0}{2^1} \right\rfloor + 1 = k + 1$$

on the carrier 2 through a formula $$\left\lfloor n \cdot \frac{2^{\mu_{PDSCH}}}{2^{\mu_{PDCCH}}} \right\rfloor + K_0$$

in accordance with the slot 2k where the DCI is transmitted, K0, the SCS ($\mu_{PDCCH}$=1) of the DCI and the SCS ($\mu_{PDSCH}$=0) of the scheduled PDSCH on the carrier 2. The terminal further determines that a specific time-domain position is first to eight symbols within the slot k+1 on the carrier 2 in accordance with the SLIV in the TDRA indicated in the DCI. FIG. 9 shows the DCI scheduling slots. The terminal receives the PDSCH on the first to eight symbols in the slot 2k+1 on the carrier 1 and the first to eight symbols in the slot k+1 on the carrier 2.

It should be appreciated that, in the embodiments of the present disclosure, the above scheme is provided merely with respect to K0 defined on the basis of the slot, and it is also applicable with respect to K0 defined on the basis of a sub-slot or any other time unit.

In the embodiments of the present disclosure, the SCSs of the carrier 1 and the carrier 2 are for illustrative purposes only, and any other SCS combination may also be applicable.

The scheduling of the transmission of the PDSCH on the carrier 1 and the carrier 2 simultaneously through the DCI on the carrier 1 is also for illustrative purposes, and the DCI on one carrier may also be used to schedule more carriers.

The scheduled carriers include or do not include the carrier where the DCI is transmitted (i.e., when the DCI is transmitted on the carrier 1, the carriers scheduled through the DCI include or do not include the carrier 1).

In the plurality of scheduled carriers, two or more carriers have a same SCS. For example, four carriers are scheduled through the DCI, two of them correspond to a 30 kHz SCS, and two of them correspond to a 15 kHz SCS. When the reference SCS is the maximum SCS as mentioned hereinabove, two carriers have the reference SCS. In the above second mode, a slot where the scheduled PDSCH is transmitted on the two carriers is directly determined, and then a slot where the PDSCH is transmitted on the other two 15 kHz carriers is determined with the slot as a reference. Alternatively, one carrier corresponds to a 60 kHz SCS, two carriers correspond to a 30 kHz SCS, and one carrier corresponds to a 15 kHz SCS. In the above combinations, the scheme in the embodiments of the present disclosure is also applicable. The above modes may be applied in a Frequency Division Duplex (FDD) scheme and a Time Division Duplex (TDD) scheme.

It should be appreciated that, in the embodiments of the present disclosure, a plurality of carriers is scheduled through one piece of DCI. The DCI may be replaced with a PDCCH, the DCI is a content carried in the PDCCH, and different DCI formats correspond to different scheduling demands and scenarios. Hence, during the transmission, the DCI is equivalent to the PDCCH, i.e., the transmission of one piece of DCI is equivalent to the transmission of one PDCHH (the PDCCH is transmitted using the DCI format), the reception of one piece of DCI is equivalent to the reception of one PDCCH (the PDCCH is received using the DCI format), and a relevant operation performed in accordance with the DCI is equivalent to a relevant operation performed in accordance with the PDCCH. When Band-Width Parts (BWPs) are divided on one carrier, the transmission of the PDSCH on the carrier specifically refers to the transmission of the PDSCH on a certain BWP on the carrier, and this BWP is an active BWP. Hence, the plurality of carriers may also be replaced with a plurality of BWPs. When a plurality of BWPs on one carrier is scheduled through the DCI, the above scheme is also applicable. Hence, when the carriers are replaced with the BWPs, the above modes may be used no matter whether the plurality of BWPs corresponds to a same carrier or different carriers.

In the embodiments of the present disclosure, when the SCS of the DCI is different from the SCS of the carrier whether the scheduled PDSCH is transmitted, $$Ks = \left\lfloor n \cdot \frac{2^{\mu_{PDSCH}}}{2^{\mu_{PDCCH}}} \right\rfloor + K_0$$

the formula is merely for illustrative purposes (Ks is an index number of the determined slot where the PDSCH is transmitted), and it is usually applied to a situation where there is no slot offset between different carriers (i.e., a situation where different carriers are synchronized and aligned with each other). When there is a slot offset between different carriers (i.e., the carriers are synchronized and aligned with each other, e.g., a start position of a slot on the carrier 1 is not aligned with a start position of a slot on the carrier 2, and there is an offset of X symbols), a formula $$K_S = \left\lfloor n \cdot \frac{2^{\mu_{PDSCH}}}{2^{\mu_{PDCCH}}} \right\rfloor + K_0 + \left\lceil \left( \frac{N^{CA}_{slot,offset,PDCCH}}{2^{\mu_{offset,PDCCH}}} - \frac{N^{CA}_{slot,offset,PDSCH}}{2^{\mu_{offset,PDSCH}}} \right) \cdot 2^{\mu_{PDSCH}} \right\rceil$$

may be used to determine the index number of the slot where the PDSCH is transmitted, i.e., the scheme in the embodiments of the present disclosure may also be adopted when the above-mentioned formula is replaced with this formula.

Based on a same inventive concept, the present disclosure further provides in some embodiments a base station side device, a user equipment, a PDSCH reception device, a PDSCH transmission device, and a computer-readable storage medium. A principle of these devices for solving the problem is similar to that of the PDSCH reception method and the PDSCH transmission method, so the implementation of these devices may refer to that of the methods, which will not be particularly defined herein.

Figure 10:
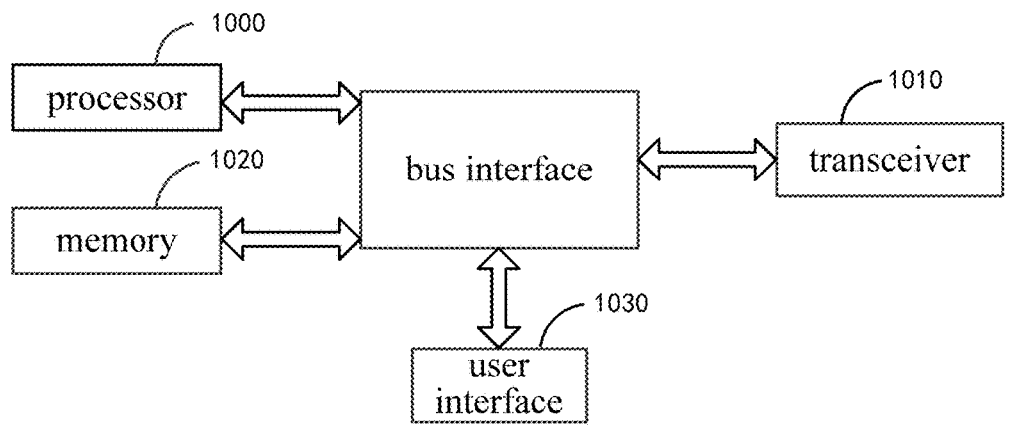
FIG. 10 is a schematic view showing a terminal according to one embodiment of the present disclosure.

As shown in FIG. 10, the present disclosure provides in some embodiments a terminal, which includes a processor 1000, a transceiver 1010 and a memory 1020. The processor 1000 is configured to read a program in the memory 1020, so as to: receive first DCI, the first DCI being used to schedule one or more PDSCHs on a plurality of carriers; determine one or more time units where the one or more PDSCHs are transmitted on the plurality of carriers in accordance with a reference SCS or an SCS of each carrier; and receive the one or more PDSCHs in the determined one or more time units on the plurality of carriers. The transceiver 1010 is configured to receive and transmit data under the control of the processor 1000.

In some possible embodiments of the present disclosure, the reference SCS is an SCS corresponding to the transmission of the DCI, a maximum one of SCSs of the plurality of carriers, or a minimum one of the SCSs of the plurality of carriers.

In some possible embodiments of the present disclosure, the receiving the one or more PDSCHs in the determined one or more time units on the plurality of carriers includes: determining a set of time-domain symbols for a PDSCH in a determined time unit on each carrier of the plurality of carriers in accordance with a start symbol and a transmission length determined in accordance with an indication field in the first DCI; and receiving the PDSCH in the determined set of time-domain symbols.

In some possible embodiments of the present disclosure, the time unit is a predefined time period including A number of symbols, a subframe, a slot or a sub-slot, where A is a positive integer.

In some possible embodiments of the present disclosure, when the one or more time units where the one or more PDSCHs are transmitted on the plurality of carriers is determined in accordance with the reference SCS or the SCS of each carrier, the processor is further configured to determine the one or more time units where the one or more PDSCHs are transmitted on the plurality of carriers in accordance with (i) a time unit offset and (ii) the reference SCS or the SCS of each carrier.

In some possible embodiments of the present disclosure, the determining the one or more time units where the one or more PDSCHs are transmitted on the plurality of carriers in accordance with the time unit offset and the reference SCS includes determining a reference time unit on the basis of the reference SCS in accordance with a time unit where the first DCI is transmitted and the time unit offset, and determining that a PDSCH is transmitted within a time unit overlapping with the reference time unit on each carrier of the plurality of carriers, the time unit offset being determined in accordance with the reference SCS.

In some possible embodiments of the present disclosure, when there is a plurality of time units overlapping with the reference time unit on each carrier of the plurality of carriers, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

In some possible embodiments of the present disclosure, when there is a plurality of time units overlapping with the reference time unit, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the SCS of each carrier includes, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

In some possible embodiments of the present disclosure, the time unit offset is one or more time unit offsets between the first DCI and the one or more PDSCHs.

In some possible embodiments of the present disclosure, the time unit offset is a time unit interval between the time unit where the first DCI is transmitted and a time unit where the scheduled PDSCH is transmitted.

In some possible embodiments of the present disclosure, the time unit offset is determined through an indication field in the first DCI, or configured through high-layer signaling.

In some possible embodiments of the present disclosure, the time unit offset is shared by the one or more PDSCHs on the plurality of carriers.

In FIG. 10, bus architecture may include a number of buses and bridges connected to each other, so as to connect various circuits for one or more processors 1000 and one or more memories 1020. In addition, as is known in the art, the bus architecture may be used to connect any other circuits, such as a circuit for a peripheral device, a circuit for a voltage stabilizer and a power management circuit. A bus interface may be provided, and the transceiver 1010 may consist of a plurality of elements, i.e., a transmitter and a receiver for communication with any other devices over a transmission medium. With respect to different UEs, a user interface 1030 may also be provided for devices which are to be arranged inside or outside the UE, and these devices may include but not limited to a keypad, a display, a speaker, a microphone and a joystick.

The processor 1000 may take charge of managing the bus architecture as well as general processings. The memory 1020 may store therein data for the operation of the processor 1000.

The present disclosure further provides in some embodiments a PDSCH reception device, which includes: a first reception module configured to receive first DCI, the first DCI being used to schedule one or more PDSCHs on a plurality of carriers; a determination module configured to determine one or more time units where the one or more PDSCHs are transmitted on the plurality of carriers in accordance with a reference SCS or an SCS of each carrier; and a second reception module configured to receive the one or more PDSCHs in the determined one or more time units on the plurality of carriers.

The implementation of the PDSCH reception device may refer to that of the above-mentioned PDSCH reception method for the terminal.

For ease of description, the components of the device are divided into various modules or units on the basis of their functions. Of course, during the implementation, the functions of the modules or units may be achieved in one or more pieces of software or hardware.

The technical solutions in the embodiments of the present disclosure will be implemented as follows.

Figure 11:
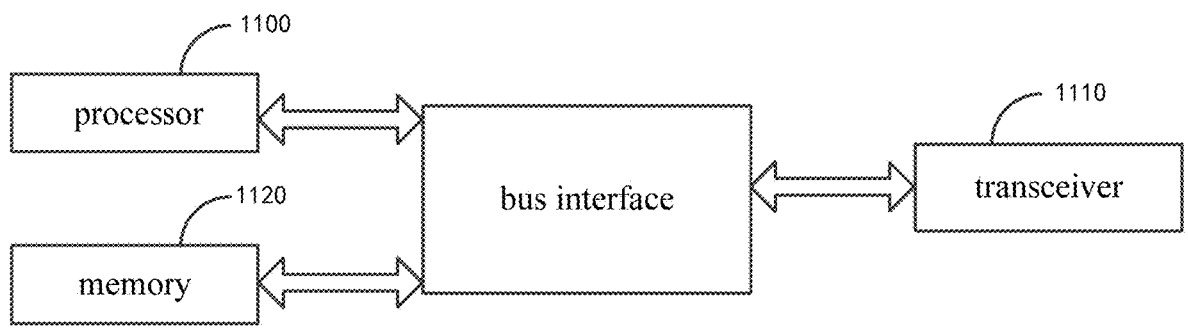
FIG. 11 is a schematic view showing a base station according to one embodiment of the present disclosure.

As shown in FIG. 11, the present disclosure further provides in some embodiments a base station which includes a processor 1100, a transceiver 1110 and a memory 1120. The processor 1100 is configured to read a program in the memory 1120, so as to: transmit first DCI, the first DCI being used to schedule one or more PDSCHs on a plurality of carriers; and transmit the one or more PDSCHs in one or more time units where the one or more PDSCHs are transmitted on the plurality of carriers. The one or more time units where the one or more PDSCHs are transmitted on the plurality of carriers are determined in accordance with a reference SCS or an SCS of each carrier. The transceiver 1110 is configured to receive and transmit data under the control of the processor.

In some possible embodiments of the present disclosure, the reference SCS is an SCS corresponding to the transmission of the DCI, a maximum one of SCSs of the plurality of carriers, or a minimum one of the SCSs of the plurality of carriers.

In some possible embodiments of the present disclosure, the transmitting the one or more PDSCHs in the one or more time units where the one or more PDSCHs are transmitted on the plurality of carriers includes transmitting, in the one or more time units where the one or more PDSCHs are transmitted, the PDSCH in a set of time-domain symbols including a start symbol and a transmission length indicated through an indication field in the first DCI on each carrier of the plurality of carriers.

In some possible embodiments of the present disclosure, when a time unit offset is indicated through the indication field in the first DCI, prior to transmitting the first DCI, the processor is further configured to determine one or more time units where the one or more PDSCHs scheduled through the first DCI on the plurality of carriers are transmitted on each carrier, and determine the time unit offset indicated in the first DCI in accordance with (i) the time unit and (ii) the reference SCS or the SCS of each carrier of the plurality of carriers.

In some possible embodiments of the present disclosure, when the time unit offset is preconfigured through high-layer signaling, prior to transmitting the one or more PDSCHs in the one or more time units where the one or more PDSCHs are transmitted on the plurality of carriers, the processor is further configured to determine the one or more time units where the one or more PDSCHs are transmitted on the plurality of carriers in accordance with (i) the time unit offset and (ii) the reference SCS or the SCS of each carrier.

In some possible embodiments of the present disclosure, the time unit is a predefined time period including A number of symbols, a subframe, a slot or a sub-slot, where A is a positive integer.

In some possible embodiments of the present disclosure, when the one or more time units where the one or more PDSCHs are transmitted on the plurality of carriers is determined in accordance with the reference SCS or the SCS of each carrier, the PDSCH transmission method further includes determining the one or more time units where the one or more PDSCHs are transmitted on the plurality of carriers in accordance with (i) a time unit offset and (ii) the reference SCS or the SCS of each carrier.

In some possible embodiments of the present disclosure, the determining the one or more time units where the one or more PDSCHs are transmitted on the plurality of carriers in accordance with the time unit offset and the reference SCS includes determining a reference time unit on the basis of the reference SCS in accordance with the time unit where the first DCI is transmitted and the time unit offset, and determining that a PDSCH is transmitted in a time unit overlapping with the reference time unit on each carrier of the plurality of carriers, and the time unit offset is determined in accordance with the reference SCS.

In some possible embodiments of the present disclosure, when there is a plurality of time units overlapping with the reference time unit on each carrier of the plurality of carriers, the PDSCH is determined to be transmitted in each time unit or in a first or last time unit among the plurality of time units.

In some possible embodiments of the present disclosure, the determining the one or more time units where the one or more PDSCHs are transmitted on the plurality of carriers in accordance with the time unit offset and the reference SCS includes one of: when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

In some possible embodiments of the present disclosure, when there is a plurality of time units overlapping with the reference time unit, the PDSCH is determined to be transmitted in each time unit, or in a first or last time unit among the plurality of time units.

In some possible embodiments of the present disclosure, the determining the one or more time units where the one or more PDSCHs are transmitted on the plurality of carriers in accordance with the time unit offset and the SCS of each carrier includes, with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, and the time unit offset is determined in accordance with the SCS of the current carrier.

In some possible embodiments of the present disclosure, the time unit offset is one or more time unit offsets between the first DCI and the one or more PDSCHs.

In some possible embodiments of the present disclosure, the time unit offset is a time unit interval between the time unit where the first DCI is transmitted and a time unit where the scheduled PDSCH is transmitted.

In some possible embodiments of the present disclosure, the time unit offset is determined through an indication field in the first DCI, or configured through high-layer signaling.

In some possible embodiments of the present disclosure, the time unit offset is shared by the one or more PDSCHs on the plurality of carriers.

In FIG. 11, bus architecture may include a number of buses and bridges connected to each other, so as to connect various circuits for one or more processors 1100 and one or more memories 1120. In addition, as is known in the art, the bus architecture may be used to connect any other circuits, such as a circuit for a peripheral device, a circuit for a voltage stabilizer and a power management circuit. A bus interface may be provided, and the transceiver 1110 may consist of a plurality of elements, i.e., a transmitter and a receiver for communication with any other devices over a transmission medium. The processor 1100 may take charge of managing the bus architecture as well as general processings. The memory 1120 may store therein data for the operation of the processor 1100.

The present disclosure further provides in some embodiments a PDSCH transmission device, which includes: a first transmission module configured to transmit first DCI, the first DCI being used to schedule one or more PDSCHs on a plurality of carriers; and a second transmission module configured to transmit the one or more PDSCHs in one or more time units where the one or more PDSCHs are transmitted on the plurality of carriers. The time unit where the one or more PDSCHs are transmitted on the plurality of carriers is determined in accordance with a reference SCS or an SCS of each carrier.

The implementation of the PDSCH transmission method may refer to that of the PDSCH transmission method for the base station.

For ease of description, the components of the device may be divided into various modules or units on the basis of their functions. Of course, during the implementation, the functions of the modules or units may be achieved in one or more pieces of software or hardware.

The present disclosure further provides in some embodiments a computer-readable storage medium storing therein a computer program. The computer program is executed so as to implement the above-mentioned PDSCH reception method and/or PDSCH transmission method.

The implementation of the computer-readable storage medium may refer to that of the PDSCH reception method for the terminal and/or the PDSCH transmission method for the base station.

In a word, according to the embodiments of the present disclosure, the one or more time units where the one or more PDSCHs are transmitted on the plurality of carriers scheduled through the first DCI are determined in accordance with the reference SCS or the SCS of each scheduled carrier.

To be specific, the terminal and the base station determine a scheduling timing design when the transmission of the PDSCH on the plurality of carriers is scheduled through one piece of DCI, so as to determine the one or more time units where the one or more PDSCHs are transmitted on each carrier, thereby to transmit and receive the scheduled PDSCH.

According to the embodiments of the present disclosure, through the scheduling timing design when the transmission of the PDSCH on the plurality of carriers is scheduled through one piece of DCI, it is able for the terminal and the base station to determine the one or more time units where the one or more PDSCHs are transmitted on each carrier on the basis of common understanding, thereby to transmit the PDSCH normally on the plurality of carriers scheduled through the DCI.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the model establishment circuitry 1, the parameter collection circuitry 2 and the analysis circuitry 3 may be processing elements arranged separately, or integrated into a chip of the above-mentioned device. In addition, these modules may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Physical Downlink Shared Channel (PDSCH) reception method, comprising:
   receiving first Downlink Control Information (DCI), the first DCI being used to schedule one or more PDSCHs on a plurality of carriers;
   determining one or more time units where the one or more PDSCHs are transmitted on the plurality of carriers in accordance with a reference Sub-Carrier Space (SCS) or an SCS of each carrier; and
   receiving the one or more PDSCHs in the determined one or more time units on the plurality of carriers.

2. The PDSCH reception method according to claim 1, wherein the method comprises at least one of the following:
   wherein the reference SCS is an SCS corresponding to the transmission of the DCI, a maximum one of SCSs of the plurality of carriers, or a minimum one of the SCSs of the plurality of carriers; and/or
   wherein the time unit is a predefined time period comprising A symbols, a subframe, a slot or a sub-slot, where A is a positive integer; and/or
   wherein the time unit offset is one or more time unit offsets between the first DCI and the one or more PDSCHs; and/or
   wherein the time unit offset is determined through an indication field in the first DCI, or configured through high-layer signaling; and/or
   wherein the time unit offset is shared by the one or more PDSCHs on the plurality of carriers.

3. The PDSCH reception method according to claim 1, wherein the receiving the one or more PDSCHs in the determined one or more time units on the plurality of carriers comprises:

determining a set of time-domain symbols for a PDSCH in a determined time unit on each carrier of the plurality of carriers in accordance with a start symbol and a transmission length determined in accordance with an indication field in the first DCI; and receiving the PDSCH in the determined set of time-domain symbols.

4. The PDSCH reception method according to claim 1, wherein when the one or more time units where the one or more PDSCHs are transmitted on the plurality of carriers is determined in accordance with the reference SCS or the SCS of each carrier, the PDSCH reception method further comprises:

determining the one or more time units where the one or more PDSCHs are transmitted on the plurality of carriers in accordance with (i) a time unit offset and (ii) the reference SCS or the SCS of each carrier.

5. The PDSCH reception method according to claim 4, wherein in mode A, the determining the one or more time units where the one or more PDSCHs are transmitted on the plurality of carriers in accordance with the time unit offset and the reference SCS comprises:

determining a reference time unit on the basis of the reference SCS in accordance with a time unit where the first DCI is transmitted and the time unit offset, and determining that a PDSCH is transmitted within a time unit overlapping with the reference time unit on each carrier of the plurality of carriers, the time unit offset being determined in accordance with the reference SCS; or wherein in mode B, the determining the one or more time units where the one or more PDSCHs are transmitted on the plurality of carriers in accordance with the time unit offset and the SCS of each carrier comprises:

with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, wherein the time unit offset is determined in accordance with the SCS of the current carrier.

6. The PDSCH reception method according to claim 5, wherein in mode A, when there is a plurality of time units overlapping with the reference time unit on each carrier of the plurality of carriers, the PDSCH is determined to be transmitted in each time unit, or in a first or last time unit among the plurality of time units; and/or wherein in mode A, the determining the one or more time units where the one or more PDSCHs are transmitted on the plurality of carriers in accordance with the time unit offset and the reference SCS comprises one of:

when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

7. A PDSCH transmission method, comprising:

transmitting first DCI, the first DCI being used to schedule one or more PDSCHs on a plurality of carriers; and transmitting the one or more PDSCHs in one or more time units where the one or more PDSCHs are transmitted on the plurality of carriers, wherein the time unit where the one or more PDSCHs are transmitted on the plurality of carriers is determined in accordance with a reference SCS or an SCS of each carrier.

8. The PDSCH transmission method according to claim 7, wherein the method comprises at least one of the following:

wherein the reference SCS is an SCS corresponding to the transmission of the DCI, a maximum one of SCSs of the plurality of carriers, or a minimum one of the SCSs of the plurality of carriers; and/or wherein the time unit is a predefined time period comprising A symbols, a subframe, a slot or a sub-slot, where A is a positive integer; and/or wherein the time unit offset is one or more time unit offsets between the first DCI and the one or more PDSCHs; and/or wherein the time unit offset is determined through an indication field in the first DCI, or configured through high-layer signaling; and/or wherein the time unit offset is shared by the one or more PDSCHs on the plurality of carriers.

9. The PDSCH transmission method according to claim 7, wherein the transmitting the one or more PDSCHs in the one or more time units where the one or more PDSCHs are transmitted on the plurality of carriers comprises:

transmitting, in the one or more time units where the one or more PDSCHs are transmitted, the PDSCH in a set of time-domain symbols comprising a start symbol and a transmission length indicated through an indication field in the first DCI on each carrier of the plurality of carriers; and/or wherein when a time unit offset is indicated through the indication field in the first DCI, prior to transmitting the first DCI, the PDSCH transmission method further comprises:

determining one or more time units where the one or more PDSCHs scheduled through the first DCI on the plurality of carriers are transmitted on each carrier, and determining the time unit offset indicated in the first DCI in accordance with (i) the time unit and (ii) the reference SCS or the SCS of each carrier of the plurality of carriers; and/or wherein when the time unit offset is preconfigured through high-layer signaling, prior to transmitting the one or more PDSCHs in the one or more time units where the one or more PDSCHs are transmitted on the plurality of carriers, the PDSCH transmission method further comprises:
  determining the one or more time units where the one or more PDSCHs are transmitted on the plurality of carriers in accordance with (i) the time unit offset and (ii) the reference SCS or the SCS of each carrier.

10. The PDSCH transmission method according to claim 7, wherein when the one or more time units where the one or more PDSCHs are transmitted on the plurality of carriers is determined in accordance with the reference SCS or the SCS of each carrier, the PDSCH transmission method further comprises:
  determining the one or more time units where the one or more PDSCHs are transmitted on the plurality of carriers in accordance with (i) a time unit offset and (ii) the reference SCS or the SCS of each carrier.

11. The PDSCH transmission method according to claim 10, wherein in mode C, the determining the one or more time units where the one or more PDSCHs are transmitted on the plurality of carriers in accordance with the time unit offset and the reference SCS comprises:
  determining a reference time unit on the basis of the reference SCS in accordance with the time unit where the first DCI is transmitted and the time unit offset, and determining that a PDSCH is transmitted in a time unit overlapping with the reference time unit on each carrier of the plurality of carriers, wherein the time unit offset is determined in accordance with the reference SCS; or
  wherein in mode D, the determining the one or more time units where the one or more PDSCHs are transmitted on the plurality of carriers in accordance with the time unit offset and the SCS of each carrier comprises:
  with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, wherein the time unit offset is determined in accordance with the SCS of the current carrier.

12. The PDSCH transmission method according to claim 11, wherein in mode C, when there is a plurality of time units overlapping with the reference time unit on each carrier of the plurality of carriers, the PDSCH is determined to be transmitted in each time unit or in a first or last time unit among the plurality of time units; and/or
  wherein in mode C, the determining the one or more time units where the one or more PDSCHs are transmitted on the plurality of carriers in accordance with the time unit offset and the reference SCS comprises one of:
  when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or
  when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or
  when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

13. A base station, comprising a processor, a memory and a transceiver, wherein the processor is configured to read a program in the memory, so as to realize the PDSCH transmission method according to claim 7,
  the PDSCH transmission method comprising:
  transmitting first DCI, the first DCI being used to schedule one or more PDSCHs on a plurality of carriers; and
  transmitting the one or more PDSCHs in one or more time units where the one or more PDSCHs are transmitted on the plurality of carriers, wherein the time unit where the one or more PDSCHs are transmitted on the plurality of carriers is determined in accordance with a reference SCS or an SCS of each carrier.

14. The base station according to claim 13, wherein the method comprises at least one of the following:
  wherein the reference SCS is an SCS corresponding to the transmission of the DCI, a maximum one of SCSs of the plurality of carriers, or a minimum one of the SCSs of the plurality of carriers; and/or
  wherein the time unit is a predefined time period comprising A symbols, a subframe, a slot or a sub-slot, where A is a positive integer; and/or
  wherein the time unit offset is one or more time unit offsets between the first DCI and the one or more PDSCHs; and/or
  wherein the time unit offset is determined through an indication field in the first DCI, or configured through high-layer signaling; and/or
  wherein the time unit offset is shared by the one or more PDSCHs on the plurality of carriers.

15. The base station according to claim 13, wherein the transmitting the one or more PDSCHs in the one or more time units where the one or more PDSCHs are transmitted on the plurality of carriers comprises transmitting, in the one or more time units where the one or more PDSCHs are transmitted, the PDSCH in a set of time-domain symbols comprising a start symbol and a transmission length indicated through an indication field in the first DCI on each carrier of the plurality of carriers; and/or
  wherein when a time unit offset is indicated through the indication field in the first DCI, prior to transmitting the first DCI, the PDSCH transmission method further comprises:
  determining one or more time units where the one or more PDSCHs scheduled through the first DCI on the plurality of carriers are transmitted on each carrier, and determining the time unit offset indicated in the first DCI in accordance with (i) the time unit and (ii) the reference SCS or the SCS of each carrier of the plurality of carriers; and/or wherein when the time unit offset is preconfigured through high-layer signaling, prior to transmitting the one or more PDSCHs in the one or more time units where the one or more PDSCHs are transmitted on the plurality of carriers, the PDSCH transmission method further comprises:

determining the one or more time units where the one or more PDSCHs are transmitted on the plurality of carriers in accordance with (i) the time unit offset and (ii) the reference SCS or the SCS of each carrier.

16. The base station according to claim 13, wherein when the one or more time units where the one or more PDSCHs are transmitted on the plurality of carriers is determined in accordance with the reference SCS or the SCS of each carrier, the PDSCH transmission method further comprises determining the one or more time units where the one or more PDSCHs are transmitted on the plurality of carriers in accordance with (i) a time unit offset and (ii) the reference SCS or the SCS of each carrier.

17. The base station according to claim 16, wherein in mode C, the determining the one or more time units where the one or more PDSCHs are transmitted on the plurality of carriers in accordance with the time unit offset and the reference SCS comprises determining a reference time unit on the basis of the reference SCS in accordance with the time unit where the first DCI is transmitted and the time unit offset, and determining that a PDSCH is transmitted in a time unit overlapping with the reference time unit on each carrier of the plurality of carriers, wherein the time unit offset is determined in accordance with the reference SCS; or wherein in mode D, the determining the one or more time units where the one or more PDSCHs are transmitted on the plurality of carriers in accordance with the time unit offset and the SCS of each carrier comprises:

with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, wherein the time unit offset is determined in accordance with the SCS of the current carrier.

18. The base station according to claim 17, wherein in mode C, when there is a plurality of time units overlapping with the reference time unit on each carrier of the plurality of carriers, the PDSCH is determined to be transmitted in each time unit or in a first or last time unit among the plurality of time units; and/or wherein in mode C, the determining the one or more time units where the one or more PDSCHs are transmitted on the plurality of carriers in accordance with the time unit offset and the reference SCS comprises one of:

when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

19. A terminal, comprising a processor, a memory and a transceiver, wherein the processor is configured to read a program in the memory, so as to: receive first DCI, the first DCI being used to schedule one or more PDSCHs on a plurality of carriers; determine one or more time units where the one or more PDSCHs are transmitted on the plurality of carriers in accordance with a reference SCS or an SCS of each carrier; and receive the one or more PDSCHs in the determined one or more time units on the plurality of carriers, wherein the transceiver is configured to receive and transmit data under the control of the processor.

20. The terminal according to claim 19, wherein the method comprises at least one of the following:

wherein the reference SCS is an SCS corresponding to the transmission of the DCI, a maximum one of SCSs of the plurality of carriers, or a minimum one of the SCSs of the plurality of carriers; and/or wherein the time unit is a predefined time period comprising A symbols, a subframe, a slot or a sub-slot, where A is a positive integer; and/or wherein the time unit offset is one or more time unit offsets between the first DCI and the one or more PDSCHs; and/or wherein the time unit offset is determined through an indication field in the first DCI, or configured through high-layer signaling; and/or wherein the time unit offset is shared by the one or more PDSCHs on the plurality of carriers.

21. The terminal according to claim 19, wherein the receiving the one or more PDSCHs in the determined one or more time units on the plurality of carriers comprises: determining a set of time-domain symbols for a PDSCH in a determined time unit on each carrier of the plurality of carriers in accordance with a start symbol and a transmission length determined in accordance with an indication field in the first DCI; and receiving the PDSCH in the determined set of time-domain symbols.

22. The terminal according to claim 19, wherein when the one or more time units where the one or more PDSCHs are transmitted on the plurality of carriers is determined in accordance with the reference SCS or the SCS of each carrier, the processor is further configured to determine the one or more time units where the one or more PDSCHs are transmitted on the plurality of carriers in accordance with (i) a time unit offset and (ii) the reference SCS or the SCS of each carrier.

23. The terminal according to claim 22, wherein in mode A, the determining the one or more time units where the one or more PDSCHs are transmitted on the plurality of carriers in accordance with the time unit offset and the reference SCS comprises: determining a reference time unit on the basis of the reference SCS in accordance with a time unit where the first DCI is transmitted and the time unit offset, and determining that a PDSCH is transmitted within a time unit overlapping with the reference time unit on each carrier of the plurality of carriers, the time unit offset being determined in accordance with the reference SCS; or
  wherein in mode B, the determining the one or more time units where the one or more PDSCHs are transmitted on the plurality of carriers in accordance with the time unit offset and the SCS of each carrier comprises: with respect to each carrier in the plurality of carriers, determining a time unit where the PDSCH is transmitted on a current carrier in accordance with the time unit where the first DCI is transmitted, the SCS of the first DCI, an SCS of the current carrier and the time unit offset, wherein the time unit offset is determined in accordance with the SCS of the current carrier.

24. The terminal according to claim 23, wherein in mode A, when there is a plurality of time units overlapping with the reference time unit on each carrier of the plurality of carriers, the PDSCH is determined to be transmitted in each time unit, or in a first or last time unit among the plurality of time units; and/or
  wherein in mode A, the determining the one or more time units where the one or more PDSCHs are transmitted on the plurality of carriers in accordance with the time unit offset and the reference SCS comprises one of:

when the reference SCS is an SCS of the first DCI, determining a reference time unit in accordance with a time unit where the first DCI is transmitted and the time unit offset, and determining that the PDSCH is transmitted within a time unit overlapping with the reference time unit on each carrier of the plurality of carriers, wherein the time unit offset is determined in accordance with the SCS of the first DCI; or when the reference SCS is a maximum SCS in the SCSs of the plurality of carriers, determining a first time unit where the PDSCH is transmitted on a carrier with the maximum SCS in the plurality of carriers in accordance with the time unit where the first DCI is transmitted, the SCS of the first DCI, the maximum SCS and the time unit offset, taking the first time unit as a reference time unit, and determining that the PDSCH is transmitted within a time unit overlapping with the reference time unit on each carrier of the plurality of carriers other than the carrier with the maximum SCS, wherein the time unit offset is determined in accordance with the maximum SCS in the SCSs of the plurality of carriers; or when the reference SCS is a minimum SCS in the SCSs of the plurality of carriers, determining a second time unit where the PDSCH is transmitted on a carrier with the minimum SCS in the plurality of carriers in accordance with the time unit where the first DCI is transmitted, the SCS of the first DCI, the minimum SCS and the time unit offset, taking the second time unit as a reference time unit, and determining that the PDSCH is transmitted within a time unit overlapping with the reference time unit on each carrier of the plurality of carriers other than the carrier with the minimum SCS, wherein the time unit offset is determined in accordance with the minimum SCS in the SCSs of the plurality of carriers.

* * * * *